US012104430B1

(12) United States Patent
Barwick et al.

(10) Patent No.: US 12,104,430 B1
(45) Date of Patent: Oct. 1, 2024

(54) ROOM ACCESS CONTROL SYSTEM WITH BARRIER ARM HAVING DOWNWARDLY EXTENDING FAN ASSEMBLY

(71) Applicant: Aegys, LLC, Lemont, IL (US)

(72) Inventors: Joseph R. Barwick, Lemont, IL (US); Stephen F. Blackler, Maryville, TN (US); Brian C. Conti, Chicago, IL (US)

(73) Assignee: Aegys, LLC, Lemont, IL (US)

( * ) Notice: Subject to any disclaimer, the term of this patent is extended or adjusted under 35 U.S.C. 154(b) by 76 days.

(21) Appl. No.: 18/125,471

(22) Filed: Mar. 23, 2023

(51) Int. Cl.
*E05C 3/06* (2006.01)
*E05B 47/00* (2006.01)
*E06B 11/02* (2006.01)
*E06B 11/08* (2006.01)

(52) U.S. Cl.
CPC ........ *E06B 11/025* (2013.01); *E05B 47/0001* (2013.01); *E06B 11/085* (2013.01); *E05B 2047/0014* (2013.01)

(58) Field of Classification Search
CPC .. E06B 11/025; E06B 11/085; E05B 47/0001; E05B 2047/0014
USPC ........................................ 49/49, 41; 160/134
See application file for complete search history.

(56) References Cited

U.S. PATENT DOCUMENTS 1,613,364 A * 1/1927 Thompson ................. B60J 3/02 160/134
5,218,775 A * 6/1993 Singer ....................... G09F 7/22 40/605
6,023,867 A * 2/2000 Gagne ....................... G09F 7/06 40/606.15
7,707,757 B2 * 5/2010 Crowell .................. G09F 11/00 40/490
8,020,603 B2 * 9/2011 Burgin .................. E06B 11/085 160/134
8,782,935 B2 * 7/2014 Forehand .................. F16P 1/00 49/49

(Continued)

FOREIGN PATENT DOCUMENTS

WO WO-2022249124 A1 * 12/2022
WO WO-2023014215 A1 * 2/2023

OTHER PUBLICATIONS

YouTube Video dated Apr. 13, 2019 at https://www.youtube.com/watch?v=5QqWv_woqbg (https://www.youtube.com/watch?v=5QqWv_woqbg).

*Primary Examiner* — Jerry E Redman
(74) *Attorney, Agent, or Firm* — McDonnell Boehnen Hulbert & Berghoff LLP

(57) ABSTRACT

A room access control system including a base assembly positionable adjacent a door opening; an arm having a first end pivotally mounted with respect to the base assembly; wherein the arm is positionable in a first undeployed position where the arm is generally vertical and the second end of the arm points downwardly; wherein a fan assembly is attached to the arm, the fan assembly including a plurality of fan blades; wherein each of the fan blades is pivotally mounted to a pivot point on the arm; wherein when the arm is rotated into a second, generally horizontal deployed position, the plurality of fan blades extend beneath the arm in a fanned out pattern with the second end of a first fan blade of the plurality of fan blades attached to the arm, and a last fan blade of the plurality of fan blades positioned in a generally vertical position.

23 Claims, 32 Drawing Sheets

(56) References Cited

U.S. PATENT DOCUMENTS

| | | | | |
|---|---|---|---|---|
| 9,644,408 | B2 * | 5/2017 | Presutti | E05C 9/085 |
| 10,006,246 | B2 | 6/2018 | Barwick et al. | |
| 10,125,525 | B2 * | 11/2018 | Presutti | E05B 53/003 |
| 2011/0222962 | A1 * | 9/2011 | Jette | E01F 13/06<br>404/6 |

* cited by examiner

ROOM ACCESS CONTROL SYSTEM WITH BARRIER ARM HAVING DOWNWARDLY EXTENDING FAN ASSEMBLY

BACKGROUND

The present application is generally directed to a system for controlling access to a room. More particularly, the system may be used for controlling ingress to and/or egress from a restricted or dangerous premises that may be found in hospitals, medical facilities and other settings. The disclosed embodiments are particularly well suited for use with rooms used for Magnetic Resonance Imaging ("MRI"), where the system clearly communicates to those nearby that a magnetic field in excess of 30,000 times stronger than the Earth's magnetic field generated by the MRI machine is always present, whether the MRI machine is imaging a patient or not, and the room is off limits, and the system deploys a physical barrier to prevent entry into the room.

There are many activities and processes carried out in the health care, industrial, and commercial fields requiring that access to a room or area is restricted or prohibited. For example, in the health care field, such areas may include an MRI suite, an operating room in a hospital, X-Ray or CT scans (radiation exposure), infectious disease control rooms, or quarantined areas. Other examples where controlled access may be desired, include laboratories, clean rooms, manufacturing facilities, or areas where hazardous activities are taking place.

Prior efforts to control access to a room or area have included the posting of warning signs to warn people that access to a room or area is restricted or limited. However, warning signs located above doors have become commonplace and may easily be ignored. Another approach has been to simply close or lock the door to the room to prevent unauthorized access. However, shutting a door isolates the individuals working in the room from the rest of the building and provides a disadvantage of preventing communication between individuals within the room and individuals outside of the room. A locked chain or retractable belt across a doorway has also been used. However, where the room requires frequent egress and ingress, the locking and unlocking of the chain, or latching and unlatching of the retractable belt, becomes tedious, and as a result the chain may remain hanging, unlocked from the side of the door frame, and the belt may remain in its retracted state. Furthermore, with out-swinging style doors, a locked chain across the outside of the door will have the undesirable result of having the occupants locked inside the room. Lastly, a locked chain or retractable belt only provides coverage across a narrow strip of the door opening unlike the coverage provided by the fan barrier assembly of this application described below.

A room having an MRI machine presents particular risks and challenges for warning and controlling access. An MRI scanner is a medical imaging technique that uses strong magnetic fields and radio waves to form images of the body. A superconducting magnet is used to create the strong magnetic fields required for imaging. However, the strong magnetic fields are also strong enough to pull ferrous objects, such as those containing, iron, cobalt, or nickel towards the superconducting magnet of the MRI scanner. Objects such as oxygen tanks, pens, scissors, screwdrivers, and other ferrous objects may be drawn towards the superconducting magnet of the MRI scanner at a high rate of speed and become a "projectile." A projectile accident is defined as an occurrence where an object containing ferromagnetic material is pulled into the superconducting magnet at a high rate of speed.

Therefore, a dangerous situation exists during an MRI scan of a patient. In particular, if a person enters the room with a loose ferrous object during the scanning process, the patient and technologist administering the scan are in danger of being hit by a projectile being drawn towards the MRI scanner. It has been reported in the New England Journal of Medicine that large objects involved in projectile accidents have included an intravenous-drug pole, a toolbox, a sandbag containing metal filings, a vacuum cleaner, mop buckets, a defibrillator, and a wheelchair, among others. Five incidents involving oxygen or nitrous oxide tanks were also reported. Thus, it is known in the industry that MRI technologists and the patients they are imaging with an MRI scanning machine are subject to bodily injury or death resulting from the occurrence of a projectile accident.

In addition, the MRI magnet is always left on, and is not powered off after working hours. As a result, the potential for the MRI scanner to draw objects towards the magnet exists 24 hours a day. Cleaning personnel may not understand the potential for cleaning implements to become projectiles and possibly damage the expensive MRI scanning machines. As result, there have been instances reported of cleaning equipment such as floor cleaners, floor buffers, mop buckets, and the like being propelled towards the magnet of the MRI scanning machine, where damage to the MRI scanning machine may occur.

As noted above, it may be possible to lock the door to the MRI suite to prevent unauthorized access, or entry of someone having a ferromagnetic object, into the MRI suite. However, the door is typically kept open at certain times for a variety of clinical reasons including patient flow, medical staff egress and ingress, emergency situations to allow for simple communication with persons outside the room, and to allow the MRI technologist to monitor activity outside of the room. Metal detectors have been employed to prevent individuals having ferromagnetic objects from entering an MRI suite while a patient is undergoing an MRI scan. However, metal detectors may be highly sensitive and provide false alarms, both false-positive and false-negative alarms. For example, many women's bras include metal wires which can set off the metal detector. Repeated instances of false alarms may result in "alarm fatigue" and may cause the technologist operating the metal detector to be less vigilant, and overly casual when the metal detector alarm sounds thereby raising the potential that a ferromagnetic object could enter the MRI suite and cause a projectile accident.

As shown in FIG. 1, labeled as Prior Art, MRI suites are generally protected with passive signage, and in some instances, illuminated signs indicating the presence of a magnetic field. For example, as shown in FIG. 1, the standard signage may use a green illuminated sign 1 displaying various warnings directly over the doorway 2 of door 3. Most visitors or even facility staff members do not understand the danger of a projectile accident that may occur by someone entering the room where the high-intensity magnetic field is located. Other symbols on doors may be used, however, they do not convey the danger and are not sufficiently active to guarantee the attention of the viewer.

An MRI room access control system has been provided with a movable barrier arm having illuminated lighting indicia to warn personnel that entry into the MRI is not allowed. See, U.S. Pat. No. 10,006,246 entitled "On Demand Modular Ingress/Egress Control Mechanism" that issued on Jun. 26, 2018. However, a barrier arm by itself may not be sufficient to prohibit entry into an MRI room, as persons can duck under the barrier arm to gain entry into the MRI room even when the barrier arm is extended across a doorway of an MRI room.

It would be desirable to provide a system that controls access to an MRI room, to protect persons and equipment in the room by adequately warning that access to the MRI suite is prohibited, and by providing a physical barrier to entry to the room without entirely isolating the room. In addition, it would also be desirable to provide a barrier arm that eliminates or reduces the ability of a person to duck under the barrier arm to gain entry into the MRI room.

SUMMARY

In one aspect, a room access control system is provided having a base assembly attachable to a wall or door jamb adjacent a door opening to a room; an arm having a first end pivotally mounted with respect to the base assembly at a stationary pivot point relative to the base for rotation about a pivot axis, the arm also having a second end; wherein the arm is positionable in a first undeployed position where the arm is generally vertical and the second end of the arm points downwardly; wherein the arm is pivotable from the first undeployed position, upwardly to a second, generally horizontal deployed position, where the arm extends at least partially across the door opening; wherein a fan assembly is attached to the arm, the fan assembly including a plurality of fan blades; wherein each of the fan blades has a first end that is pivotally mounted to a pivot point on the arm; wherein each of the fan blades has a second end that is attached to, and movable with respect to, an adjacent fan blade; wherein when the arm is in the first undeployed position, each of the plurality of fan blades is in a generally vertical position beneath the arm; and wherein the arm is in the second, generally horizontal deployed position, the plurality of fan blades extend beneath the arm in a fanned out pattern with the second end of a first fan blade of the plurality of fan blades attached to the arm, and a last fan blade of the plurality of fan blades positioned in a generally vertical position.

In another aspect, a first room access control system as described in the Paragraph above is provided having an arm extending inwardly from a left side of a doorway when the arm is in the second, generally horizontal deployed position, and a second room access control system constructed as described in the Paragraph above is provided having an arm extending inwardly from a right side of the doorway when the arm is in the second, generally horizontal deployed position.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION

The foregoing summary, as well as the following detailed description of certain embodiments of the present invention, will be better understood when read in conjunction with the appended drawings.

As used herein, an element or step recited in the singular and preceded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 2:
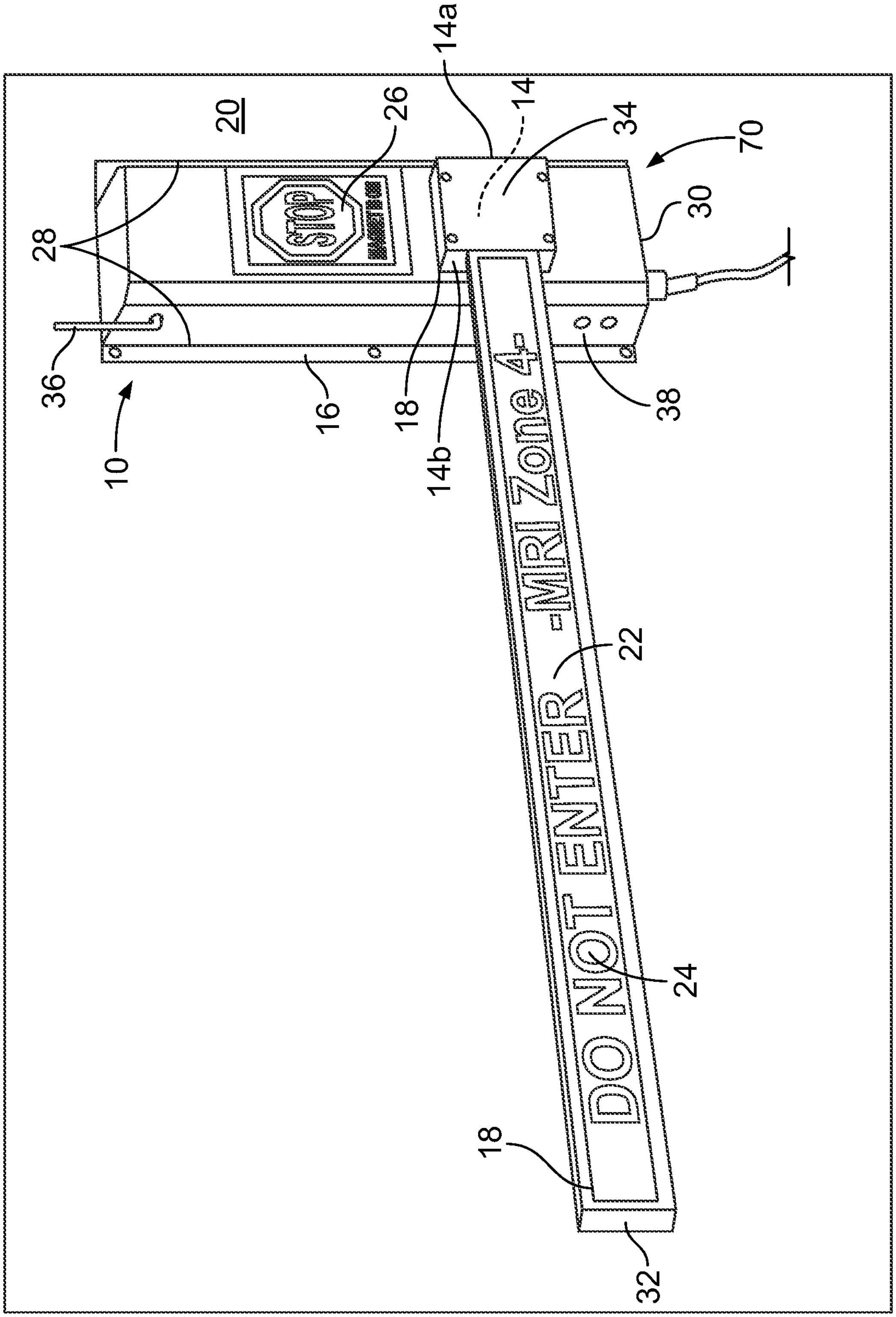
FIG. 2 illustrates one embodiment of an access control system 10, in accordance with features of an example embodiment.

An example embodiment of room access control system 10 is shown in FIG. 2. Room access control system 10 includes a base 12 that may be mounted on the side of a door or a door jamb or a door opening. It is also contemplated that base 12 may be mounted within a door frame or may be built into the door frame so that the face of the base 12 is flush with the door frame. The base 12 may also be mounted to a pole, which may in turn be secured to a wall adjacent the MRI suite. Base 12 may also be positioned in, or mounted on, a mobile cart.

As shown in FIG. 2, the room access control system 10 is shown in a deployed state with arm 22 extending in a generally horizontal position from arm receptacle 14 where it may extend across a doorway of an MRI suite to provide a physical barrier to entry into the MRI suite while an MRI scan is being performed. Prior to deployment, the arm 22 may be positioned in a generally vertical position extending beneath base 12 (as shown in FIG. 11A), or may be positioned in a generally vertical position extending above base 12. As used herein the term "generally horizontal" means +/−30 degrees from horizontal, and the term "generally vertical" means +/−30 degrees from vertical. The base may include warning indicia 26 which may take the form of a "stop sign." Warning indicia 26 may be illuminated with bright lights, such as LED lights, and may flash to provide a warning pertaining to the strong magnetic field produced by the MRI scanner.

Similarly, the arm 22 may also include warning indicia 24 that warn persons not to enter the MRI suite. Warning indicia 24 may be illuminated with bright lights, such as LED lights, and may also flash to warn persons not to enter the MRI suite, or to alert them of the danger within the MRI suite.

During and following deployment of the arm 22 to the deployed, generally horizontal position as shown in FIG. 2, the warning indicia 24 and 26 may be illuminated. In fact, the warning indicia 24 and 26 may be illuminated during all phases of arm deployment. For example, the warning indicia may be illuminated prior to movement of the arm 22 to the deployed, generally horizontal position, during movement from the undeployed generally vertical position to the deployed, generally horizontal position, and may stay illuminated or flashing while the arm 22 is in the deployed, generally horizontal position.

As noted above, MRI technicians must operate with an understanding of the dangerous environment in which they work, and the risk of a projectile accident occurring. As a result, some MRI technicians have a feeling of vulnerability or are unable to administer quality patient care because their personal safety is at risk, while in the MRI suite. The use of the room access control system 10 provides MRI technicians with greater safety, and provides a "peace of mind" knowing that a physical barrier is extended across the doorway to the MRI suite. In this regard, some embodiments may provide an audible tone or melody once the arm 22 has been deployed to the generally horizontal position across the doorway. The use of an audible tone allows the MRI technician to focus on preparing for or conducting an MRI scan without requiring the MRI technician to look back towards the doorway to insure that the arm 22 is properly extended. Similarly, the rear side of the arm may be provided with illuminated rear indicators or illuminated perforations that may extend all the way across the rear side of the arm like runway lights to inform the MRI technician that the arm 22 is properly deployed and the warning indicia are operating properly. The illuminated rear indicators or perforations allow the MRI technician to know with a simple glance towards the doorway that the room access control system 10 is properly operating and protecting the MRI technician and patient.

Room access control system 10 may also be advantageously provided with the ability to program the illuminated warning indicia 24 and/or 26 on the base 12 and/or arm 22 to change color, flash or otherwise react to the movement of the arm 22 or other programming logic incorporated on the controller board in the base 12. In addition, the warning message provided by warning indicia 24 and/or 26 may also be programmed to change to provide differing messages and warnings, depending on the particular application. For example, warning messages could be provided in different languages, where a warning in English could be followed by a warning in Spanish, as an example. In fact, customized messaging may be provided in real time through a centralized system used to control various room access control systems 10. Additionally, the arm may be equipped with an LED or LCD screen where messages can be scrolled across the screen to create a runway like effect on the arm to draw attention of the arm to persons in the vicinity of the arm.

Furthermore, an ancillary illuminated warning sign may also be provided that could be mounted above the doorway, or on an opposite side of the door from the base 12 that could convey the same or different messages than the warning indicia 26 on base 12. The ancillary illuminated warning sign may be connected to a logic controller in base 12 and be controlled by the same triggers or programming logic as the warning indicia 26 in the base 12. The ancillary illuminated warning sign could be plugged into or hardwired with the base, or communicate wirelessly with the base. The ancillary illuminated warning sign may be illuminated with LED lights that are synched or coordinated with the warning indicia 26 on the base, such as a flashing STOP sign, or with the illuminated indicia 24 on the arm 22.

Additionally, the room access control system 10 may also serve as a data collection system, recording the number of people entering and exiting the MRI suite, and the time of such entries and exits. The information could later be analyzed to improve patient workflow and efficiency.

In addition, while the room access control system contemplates having the arm move from a generally vertical position when not deployed to a generally horizontal position when the arm is deployed. In some applications, it may desirable to have the arm be in a generally vertical position when deployed and in a generally horizontal position when not deployed.

The present embodiments are described in the context of an MRI suite. However, the room access control systems described herein may also be deployed in conjunction with any process where access control is desired while maintaining an open or partially opened door. For example, room access control system 10 shown in FIG. 2 could be used in to provide warnings and limit access to Infectious Control Rooms, X-Ray or CT scanning rooms, manufacturing facilities, laboratories, buildings under construction, out-of-order bathrooms, etc.

For example, arm 22 may be extended across a doorway while the premises are being flooded with ultra-violet light for disinfection purposes. As another example, arm 22 may be extended across the entrance to a 'clean room' environment.

Room access control system 10 may be activated in a number of ways. For example, manual actuation buttons 38 on base 12 may be used to activate the system to move the arm 22 to its deployed, generally horizontal position, and also to move the arm 22 to its undeployed generally vertical position above or below the base 12. However, waiting for the arm 22 to retract before exiting the room may have the undesirable effect of interrupting the work flow of the MRI technician. Therefore, the room access control system may advantageously be operated using a remote transmitter. For example, a first remote transmitter may be positioned just inside the doorway of the room, so that an MRI technician can enter the MRI suite, press a button or switch on the first remote transmitter to activate the movement of arm 22 to its deployed, generally horizontal position across the doorway of the MRI suite. By the time the technician reaches the MRI machine, the arm 22 may be in its fully deployed state so that the MRI technician can begin preparing for the MRI scan without having to wait for the arm 22 to be deployed.

Similarly, a second remote transmitter may be positioned on or near the MRI machine, so that when the MRI technician desires to leave the MRI suite, the MRI technician may press a button or switch on the second remote transmitter to activate movement of arm 22 back to its undeployed, generally vertical position above or below the base 12. By the time the MRI technician reaches the doorway to exit the MRI suite, the arm 22 may no longer block the doorway so that the MRI technician does not have to wait to exit the room.

Thus, the use of one or more remote transmitters within the room provides an advantage of not interrupting the work flow of the MRI technician. However, because of the potential for the remote transmitter itself to become a projectile, the remote transmitters positioned within the MRI suite are advantageously provided with a low-ferrous design, where the internal components and battery of the remote transmitter are of a low-ferrous design such that there is not enough ferrous material in the remote transmitters for them to become a projectile within the MRI suite. As used herein, the term "low-ferrous" remote transmitter is defined as a remote transmitter that is comprised of a low amount of ferrous material such that the magnet of the MRI machine does not exert a magnetic force on the remote transmitters such that it becomes a projectile, and also is not adversely affected by the strong magnetic forces of the MRI machine such that it will still operate to activate the arm 22 when positioned within the MRI suite. A remote transmitter operating at 315 MHZ having part number CMD-KEY1-315 available from LINX Technologies, Inc. and using a 3V CR2032 lithium button cell for a battery, such as part number CR2032 GLD 3V 210 MAH coin cell battery available from Zeus Battery Products, may be used as a suitable low-ferrous remote transmitter.

Furthermore, other techniques may be used to activate the arm. For example, voice activation may be used where the system recognizes certain commands to activate the arm. A proximity sensor or IR sensor could also be used. In addition, an RFID sensor could be used which could be worn by maintenance personnel to activate the arm when those personnel come near the doorway where the system is positioned. A Bluetooth sensor or smartphone sensor could also be used to activate the arm when proximity to the door opening is sensed.

Other possibilities exist as well. For example, a ferromagnetic sensor could be based with the system and when a ferrous object is detected the arm may be activated. A time-counting activation device could also be that allows the doorway to be open for a predetermined period of time or which does not allow for extension of the arm until a predetermined amount of time has passed after a person has penetrated the threshold of the doorway.

As shown in FIG. 2, base 12 may be in rotatable communication with an arm receptacle 14. The base 12 is shown mounted to a wall plat 70, and the wall plate 16 is in turn attached to a wall 20. The base 12 includes a base assembly or housing 70 that substantially encapsulates internal componentry of the room access control system 10 and electrically isolates the componentry from regions exterior of the base assembly or housing 70. Portions of the housing 70 can provide a means for pulling heat away from the componentry so as to act as a heat sink.

Figure 9:
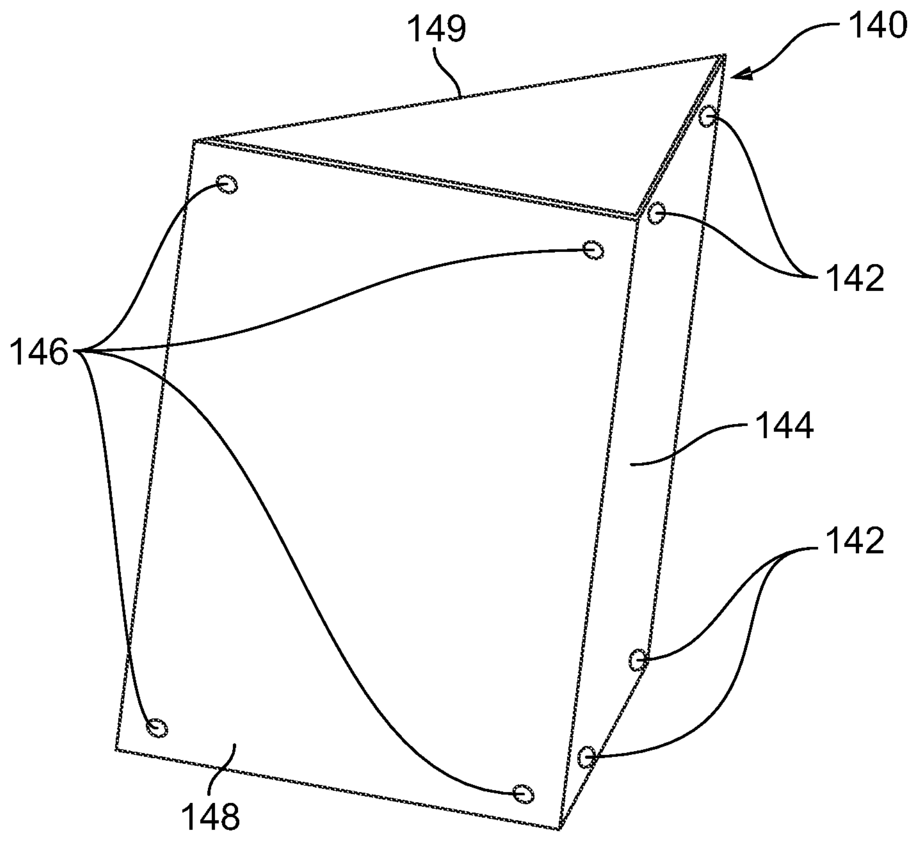
FIG. 9 is a perspective view of support bracket 140 that may be used as a support for base 12 shown in FIG. 2; in accordance with features of an example embodiment.

The base 12 can be mounted on either an in-swing or out-swing door opening, specifically on the hinge-side or non-hinge side of an in-swing door or the non-hinge side of an out-swing door opening. Furthermore, some MRI/Medical doorways have a perpendicular wall on one side of the doorway or a corridor leading to a door opening. For addressing this situation an L-shaped bracket, as shown in FIG. 9 may be used for mounting base 12, and allows the room access control system 10 to be mounted securely and function in the same way as it would if mounted on the side of the door.

An arm assembly 18 may be removably attached to the base 12 using arm receptacle 14. For example, the arm assembly 18 may be slidably received by the base 12, or received in a snap fit configuration by the base 12, or magnetically coupled to the base 12.

In the embodiment shown in FIG. 2, the arm assembly 18 comprises an arm 22 that may be made from a light weight material selected from the group consisting of acrylic, aluminum, wood, carbon fiber, fiberglass and combinations thereof. Other materials may also be used to construct the arm 22. The arm 22 displays warning indicia 24. Optionally, outwardly facing surfaces of the base 12 display warning indicia 26. Additionally, as discussed in more detail below with respect to FIGS. 22A and 22B, perforations or holes may be formed on the back side of arm 22 to illuminate the rear side of arm 22 to those persons within the restricted area.

The arm assembly 18, as shown in the embodiment of FIG. 2, comprises an arm 22 with a first end 32 and a second end in pivotal communication with a region of the outwardly facing surface of the base 12 defining a pivot point 34. The pivot point 34 may define a nut-bolt configuration or a snap fit configuration the latter of which may be used to provide a reversible attachment of the arm 22 to the base 12. A removable attachment facilitates the disengagement of the arm 22 from the base 12 in the event of an emergency or inadvertent collision, and is shown in detail below. Furthermore, a removable arm allows for the base 12 to be positioned on the left or right side of the doorway, and the arm receptacle 14 may be adapted to removably receive an end of arm 22 on the right or left side of arm receptacle 14. Further, the removable attachment is truly modular allowing for the repair or upgrade of the arm 22.

The arm 22 pivots around the pivot point 34 from an undeployed, generally vertical position which is generally parallel to the sides 28 of the base 12 (and generally parallel to the vertically disposed portions of the door jamb) to the deployed, generally horizontal position wherein the arm 22 forms an angle α to the sides of the base 12. While FIG. 2 shows the arm as substantially perpendicular to the longitudinal sides 28 of the base 12, a myriad of angles may be suitable, ranging from about 45 degrees to about 135 degrees. An embodiment of the deployed configuration is shown in in FIG. 2.

With arm 22 in the deployed state shown in FIG. 2, the arm indicia 24 and the base indicia 26 may be illuminated. In one embodiment, the arm indicia 24 and the base indicia 26 flash, remain constant, or otherwise illuminate once the arm 22 has been deployed. In further embodiments multiple colors may be utilized to correspond with differing stages of deployment.

In another embodiment, a sound generating component of the base 12 may be engaged during the deployment process when the arm 22 is switching from the undeployed state to the deployed state shown in FIG. 2 to alert those in the vicinity that the arm 22 is being moved into a deployed position.

In one embodiment, the base 12 further comprises a radio frequency antenna 36 for receiving wireless signals from a remote transmitter (or vice versa where the base incorporates a transmitter to communicate with a receiver). The arm 22 may be deployed or undeployed in response to receipt of a wireless communication signal by control circuitry found within the base 12 as captured by the antenna 36. In one embodiment, the antenna 36 receives unencrypted signals over industry-standard frequencies such as those not subject to national regulation, i.e. 900 Mhz and 2.4 Ghz and 5 Ghz. Optionally, the antenna 36 receives encrypted signals from the remote.

In one embodiment, a side 28 of the base 12 includes manual actuation buttons 38 which can be used to deploy or undeploy the arm 22. The buttons 38 may also be used to select an encryption key for the wireless signal. In this embodiment, when both keys are pressed, the control circuitry within the base 12 selects a random encryption key and broadcasts it using the antenna 36. The encryption key is received by the remote. Upon acknowledgement of receipt of the encryption key by the remote, the control circuit ceases sending out of the encrypted key.

In one embodiment, the encryption keys are set by a series of dip switches in the remote and on the base. In order to function, banks of corresponding dip switches must be set to the same value.

In one embodiment, the base 12 is advantageously powered by a standard household current, 110-130V, with a power plug extending from an exterior surface of the base, such as the bottom surface 30 of the base 12. As a result, no additional wiring or services of an electrician are required to install the room access control system 10. This is a particularly useful feature, as running wire and interrupting the existing electrical system to install a room access control system could be a complex and bureaucratic task. Inasmuch as during operation the room access control system 10 preferably does not exceed 2.75 amps of current, the system is amenable to being powered by a backup power source, such as an off-the-shelf uninterruptible power supply or a low current generator. In another embodiment, the base 12 may be powered by a direct current battery, such as standard 12V batteries used with cordless tools. This DC configuration is particularly applicable when the system is used as a completely modular unit, so as to be wheeled from passageway to passageway, as needed. In this configuration, the system may be placed on a cart along with its power supply. The power supply can be reversibly attached to the base 12 of the system 10 for cosmetic purposes, or else in electric communication with the system via standard insulated conductors. Thus, the room control access system 10 may be made portable through the use of a battery pack.

Figure 1:
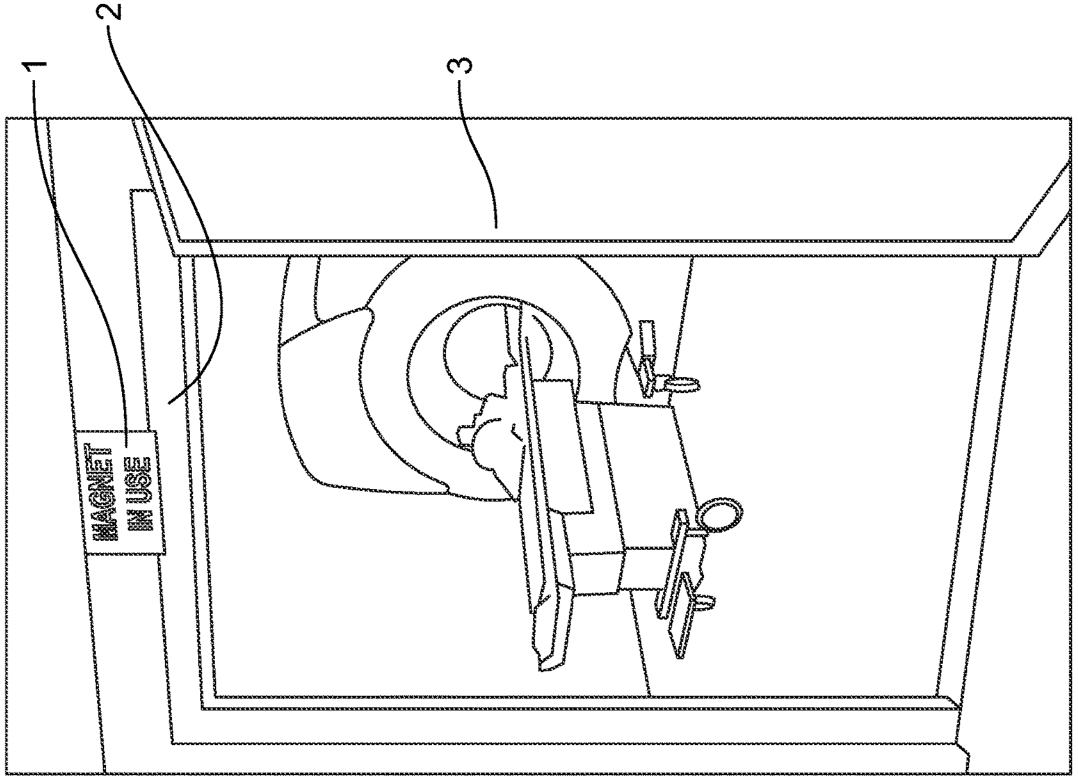
FIG. 1 (PRIOR ART)
FIG. 1 illustrates a prior art notification system for limited access premises.
Figure 3:
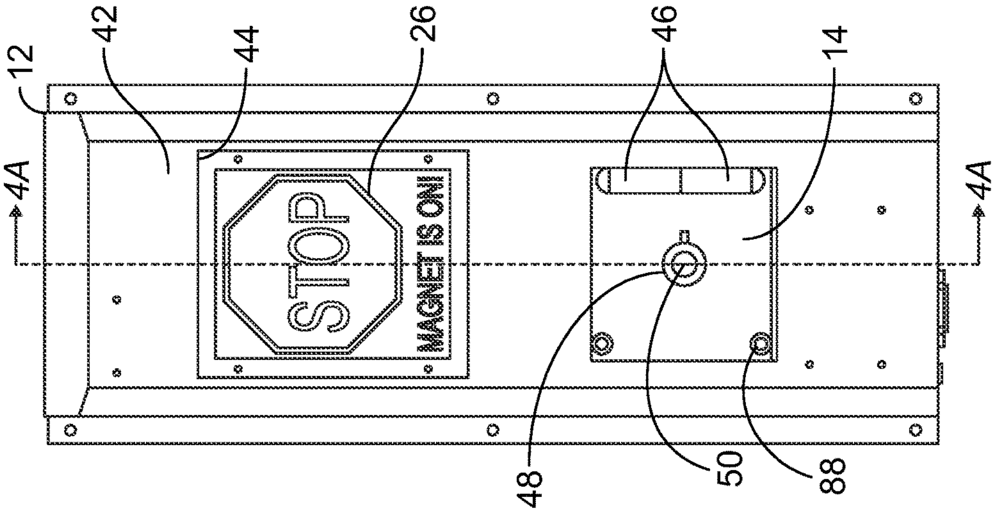
FIG. 3 is a front view of the base 12 of the access control system 10 of FIG. 2, in accordance with features of an example embodiment.

As shown in FIGS. 2 and 3, base 12 includes a front plate 42 positioned over base assembly 70 to encapsulate the interior components of the base 12. The front plate 42 includes a mounting point 44 for the base warning indicia 26. In the embodiment shown in FIG. 3, the mounting point facilitates the installation of any number of removable warning indicia 26. The warning indicia 26 can be added or removed depending on the desired cautionary message to be displayed thereon. In the embodiment shown in FIG. 3, the warning indicia 26 cautions against the danger of the magnetic field, but could include other messages. In one embodiment, the indicia mounting point 44 includes removable attachment means, such that the indicia 26 can replaced in the field, as the base 12 is moved from one application to another. For example, as shown in FIG. 3, the warning indicia 26 can be bolted on using screws or other threaded members. The removable attachment of warning indicia 26 to the mounting point 44 also allows for the replacement of the indicia 26 in the event that the indicia ceases to illuminate, or in the event that brighter illumination is required or becomes feasible. Also, warning indicia may be modular, for example a low-powered LED with its own power source can be removably attached to the housing such as via magnets, hook and pile connectors (e.g. Velcro) or with a simple elastic band adapted to encircle the housing unit.

In another embodiment, the attachment means are designed to be operable only in one direction, such as with anti-theft fasteners so as to allow fastening to the faceplate of the housing and prevent the unauthorized removal of the warning indicia 26 or other defacement.

The front plate 42 further includes an arm receptacle 14. The receptacle 14 is shown with a pair of weld-on hinges 46, discussed in more detail below. The arm receptacle is shown with a keyed aperture 48 containing an arm actuator pin 50. The aperture 48 may be keyed to ensure that the arm 22 is installed in the correct orientation. Alternatively, and as discussed supra, the receptacle facilitates magnetic interaction with a ferrous containing portion of the arm.

Figure 4C:
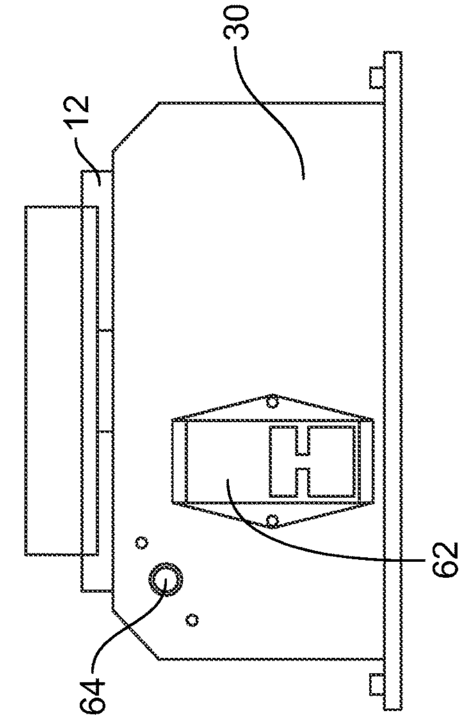
FIG. 4C is a bottom view of base 12 shown in FIGS. 2 and 3.
Figure 4A:
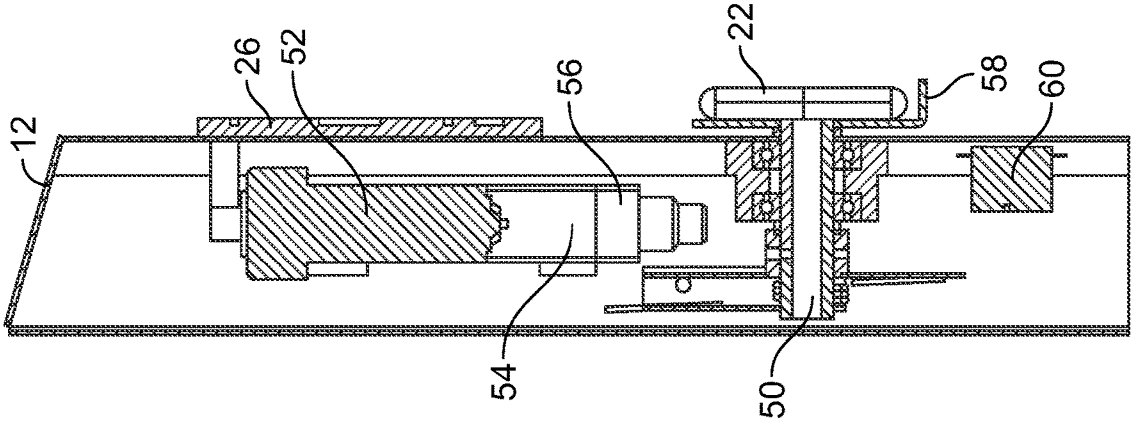
FIG. 4A is a cross-sectional view of the base 12 of the access control system 10 shown in FIGS. 2 and 3 taken along line 4A-4A in FIG. 3.

FIG. 4A is a cross-sectional view of base 12 taken along lines 4A-4A of FIG. 3. Installed within the base 12 is a linear drive 52 that may be used to rotate arm 22. The linear drive 52 comprises a cylindrical body 54 and drive element 56. The drive element 56 may be affixed to an off center edge of a round plate (69 in FIG. 4B) which upon extension of the drive element 56, serves to rotate the plate. The arm actuator pin 50 is affixed to the center of the round plate (69 in FIG. 4B) and the rotation of the plate 69 in turn rotates the actuator pin 50 which in turn rotates the arm 22. The drive element 52 is further connected to the cautionary indicia 26 and therefore the indicia 26 are illuminated when the drive element 56 is extending.

In one embodiment, there are mechanical limit switches which are set on the linear drive that communicate the relative position of the arm 22 from disengagement, active deployment, to engagement and back again. A logic controller may run the program to activate the cautionary indicia 24 to correspond with the position or activity of the arm 22.

Optionally, a support plate 58 may be installed around the second end of arm 22 to serve as a counter weight to the arm 22 and to increase rigidity of the arm 22. Power and control circuitry is located within the base 12 in a replaceable module 60.

Figure 4B:
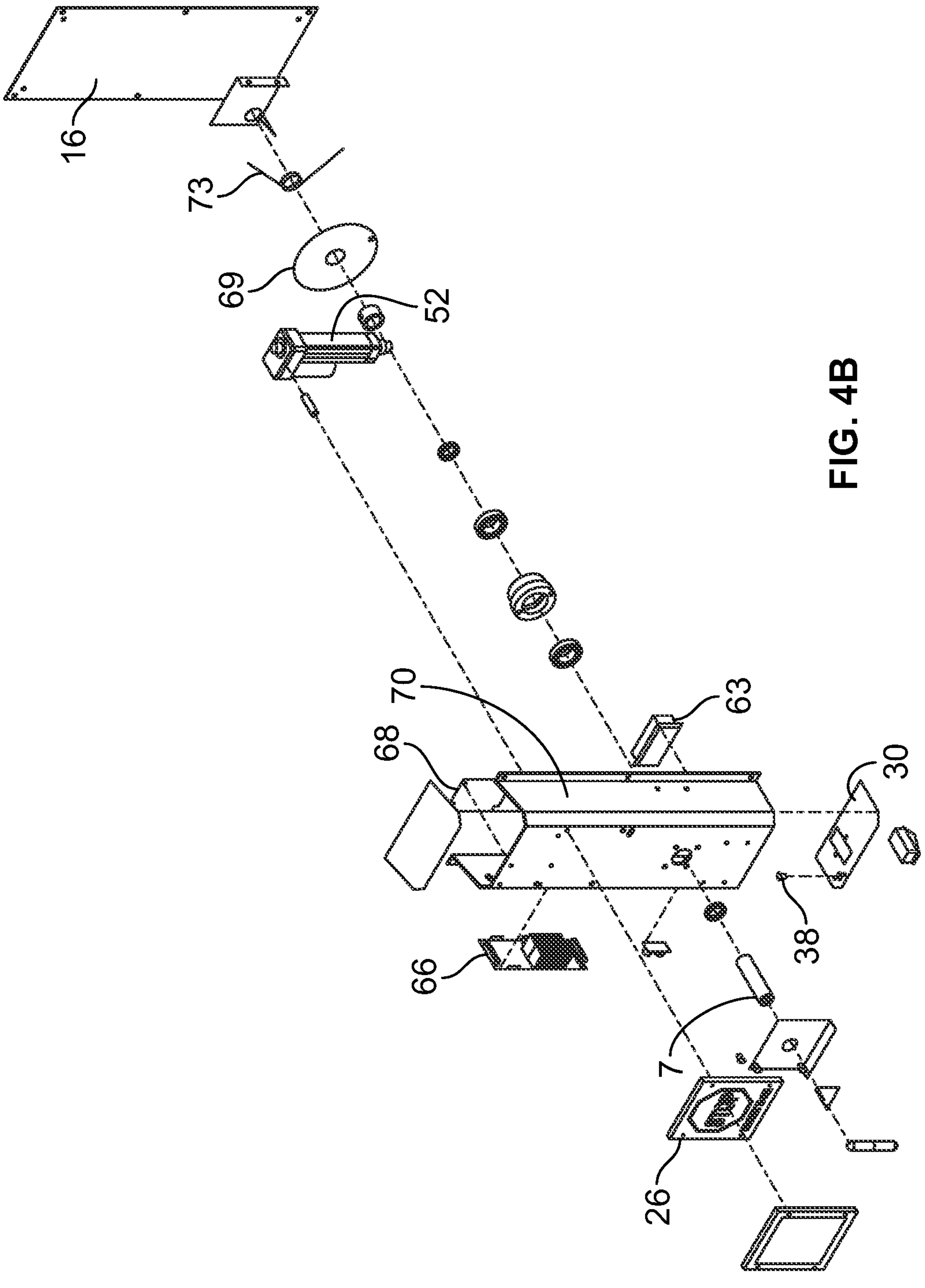
FIG. 4B is an exploded view of the base 12 shown in FIGS. 2 and 3.

FIG. 4B is an exploded view of components of base 12. Power supply 63 provides electrical power to the control board 66 which in turn runs a stored programmed set of instructions. The instructions are executed in response to input from the button 38 or the RF receiver 68. Upon activation from either element, the linear drive 52 extends which in turn rotates the round plate 69 which in turn rotates the attached arm 22. The plate 69 is under spring loaded tension from torsion spring 73 which controls the velocity of the rotation and position. Limit switches on the linear drive 52 provide position data to the control board 66 to activate the display flash for warning indicia 26 or illumination color changes on the arm 22.

Figure 6A:
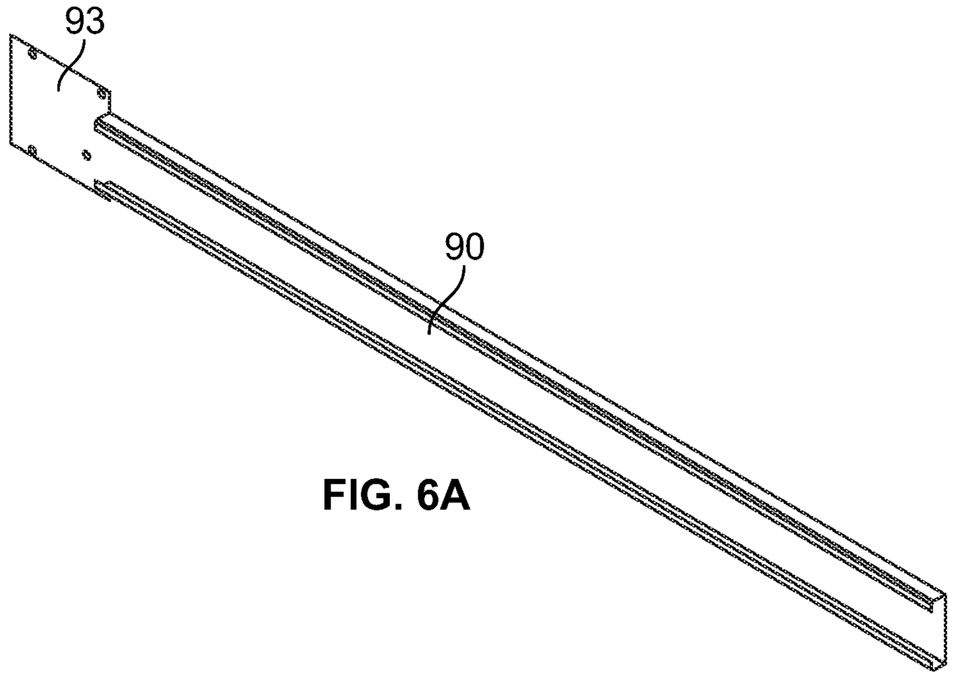
FIG. 6A is a perspective view of a base segment 90 that may be used with arm 22 shown in FIG. 2, in accordance with features of an example embodiment.
Figure 6B:
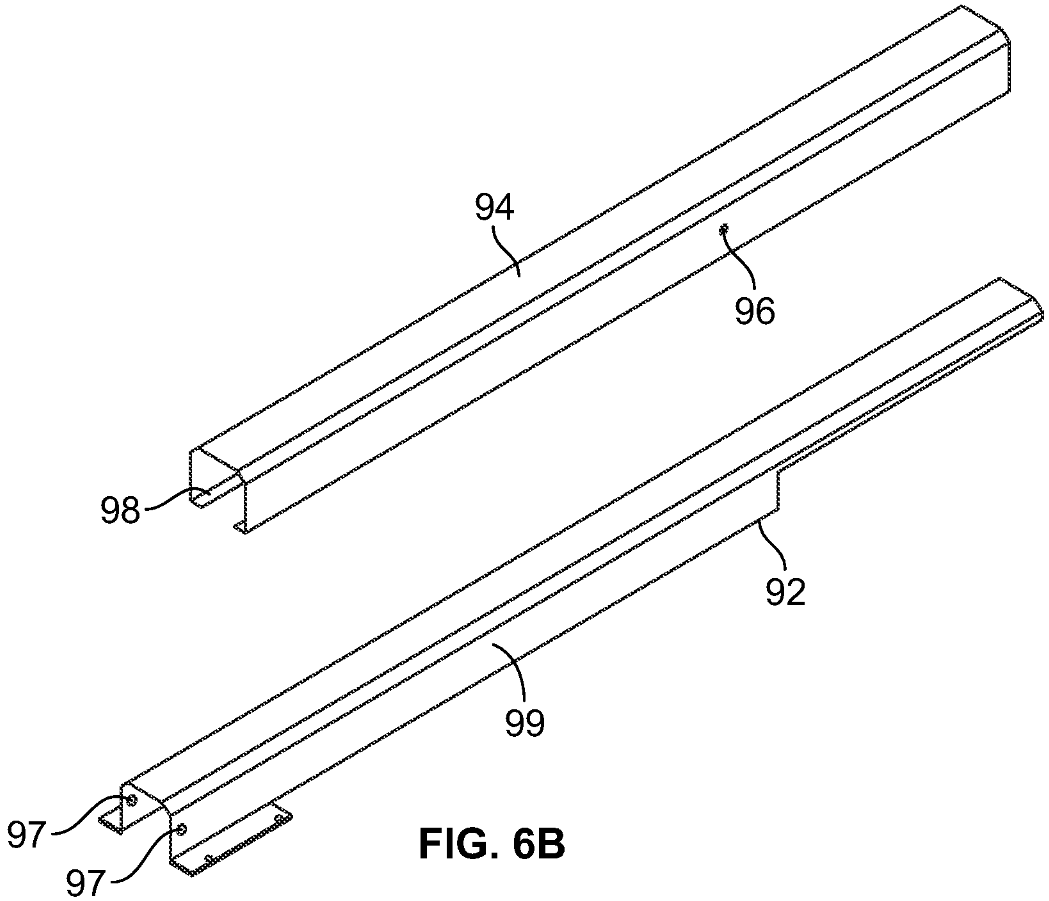
FIG. 6B is a perspective view of telescoping components that may be used with arm 22 shown in FIG. 2, in accordance with features of an example embodiment.

In some embodiments, as illustrated in FIGS. 6A and 6B, the arm may include an arm extension. In such embodiments, the limit switches in the linear drive 52 communicate when the rotation of the arm 22 has moved into a horizontal position, at which time the linear actuator in the arm is activated to extend the arm extension.

The room access control system 10 is modular and the base 12 can be used with either a non-telescoping arm or a telescoping arm, and in either case the arm may be an illuminated or non-illuminated arm. Additionally, in alternative embodiments, upgraded arms may be designed to operate with the base 12. A connector detector of voltage may be used that allows for the base 12 to recognize which arm has been attached and to activate the appropriate operational programs stored on the control board. In another embodiment, each arm includes an encrypted identifier to signify which arm has been installed on the base.

In one embodiment, the system includes an ultrasonic, RF, or laser sensor that will monitor for the presence of someone standing in the path of the arm as it is deployed that will prevent operation upon detection of a person or object in the path. Additionally, a voltage monitoring chip may be used that monitors the operation of both the linear drive and telescoping linear actuator for spikes in current associated with resistance (if the arm were to come in contact with an object) and if pre-set thresholds are reached, the system will reverse the current operation until either a default engagement or disengagement state is achieved.

FIG. 4C shows the bottom plate 30 of the base 12. A power socket 62 is located on the bottom plate 30. The power socket 62 accepts a standard power cord using a friction fit, and in one embodiment wherein the socket 62 is a C13 receptacle accepting IEC 60320 compliant power cords. The bottom plate 30 further includes an LED indicator 64 to show that control circuitry is receiving power and is operating correctly.

Figure 5B:
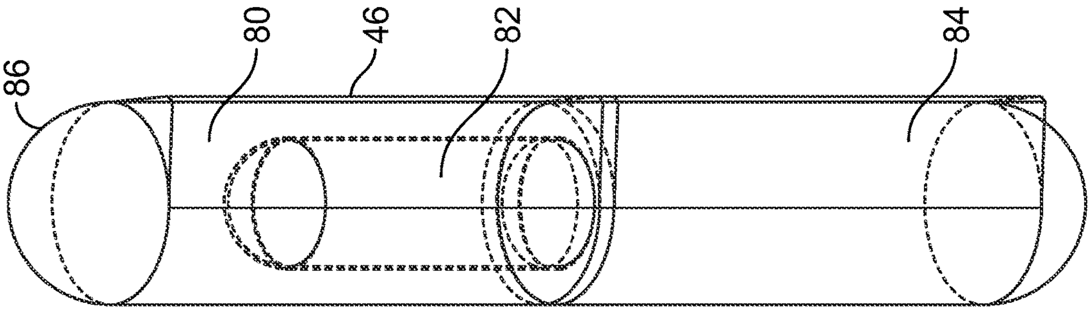
FIG. 5B is a perspective view of a hinge 46 shown in FIG. 3, in accordance with features of an example embodiment.
Figure 5A:
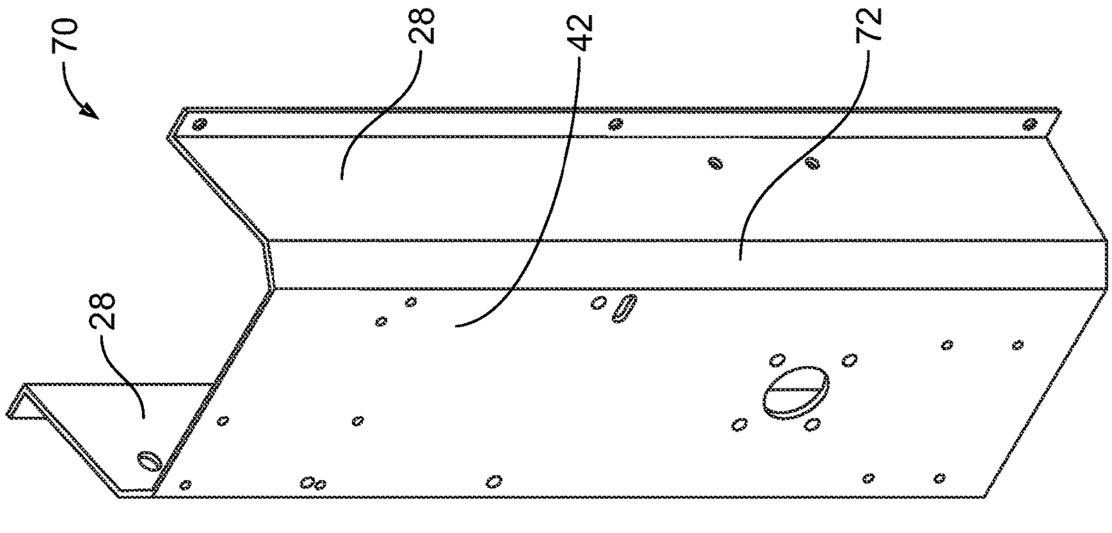
FIG. 5A is a perspective view of a base assembly 70 of the base 12 shown in FIGS. 2-4C.

FIG. 5A shows an embodiment of a base assembly or housing 70 of base 12. The base assembly 70 includes sides 28 and front plate 42 which may be formed as a single piece to facilitate ease of manufacture. Corners 72 may be formed at the intersection of the sides 28 and the front plate 42 that are tapered to eliminate sharp edges where a user may be injured. The intersection between the base assembly 70 and bottom plate 30 (and top plate) may also be tapered.

Figure 15:
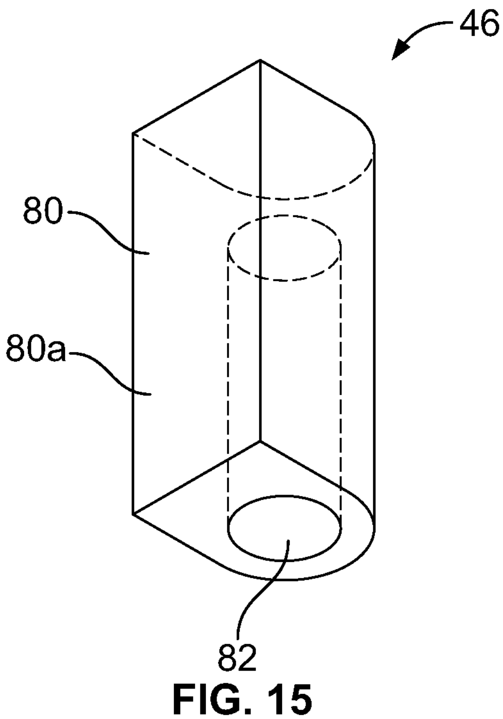
FIG. 15 is a perspective view of upper hinge section 80, according to an example embodiment.
Figure 16:
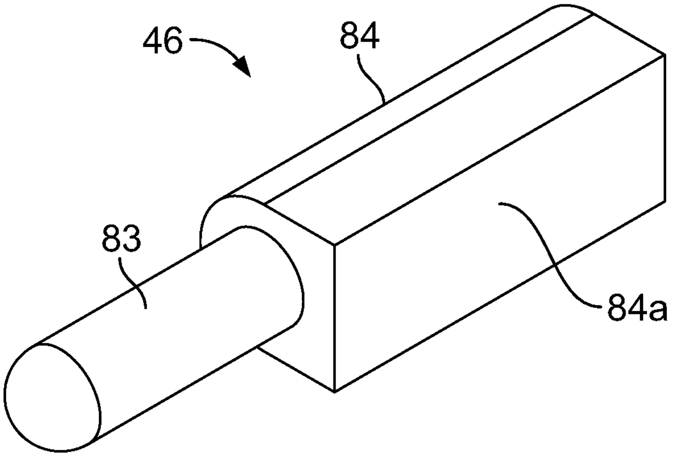
FIG. 16 is a perspective view of lower hinge section 84, according to an example embodiment.
Figure 25:
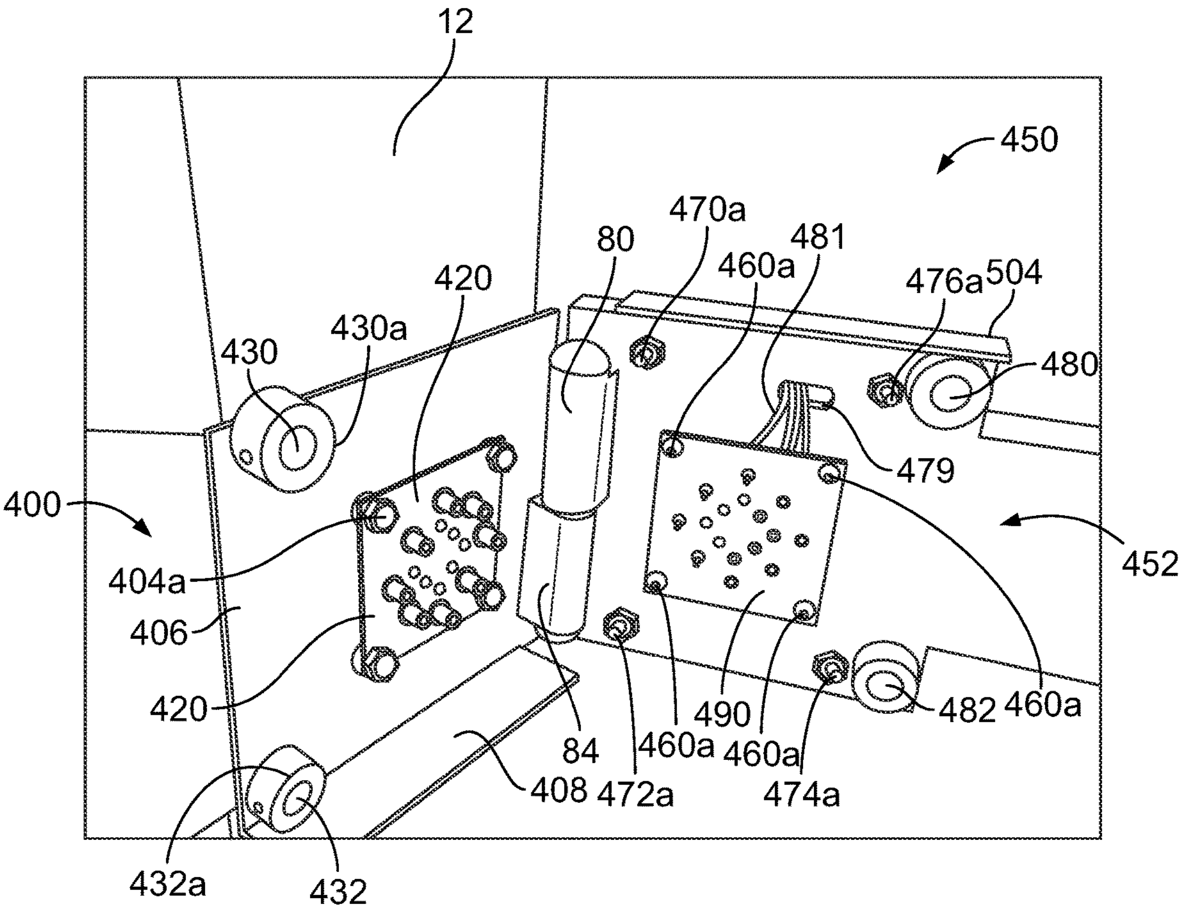
FIG. 25 is a perspective view of the attachment of a quick release attachment of the arm to the base, according to an example embodiment.
Figure 27:
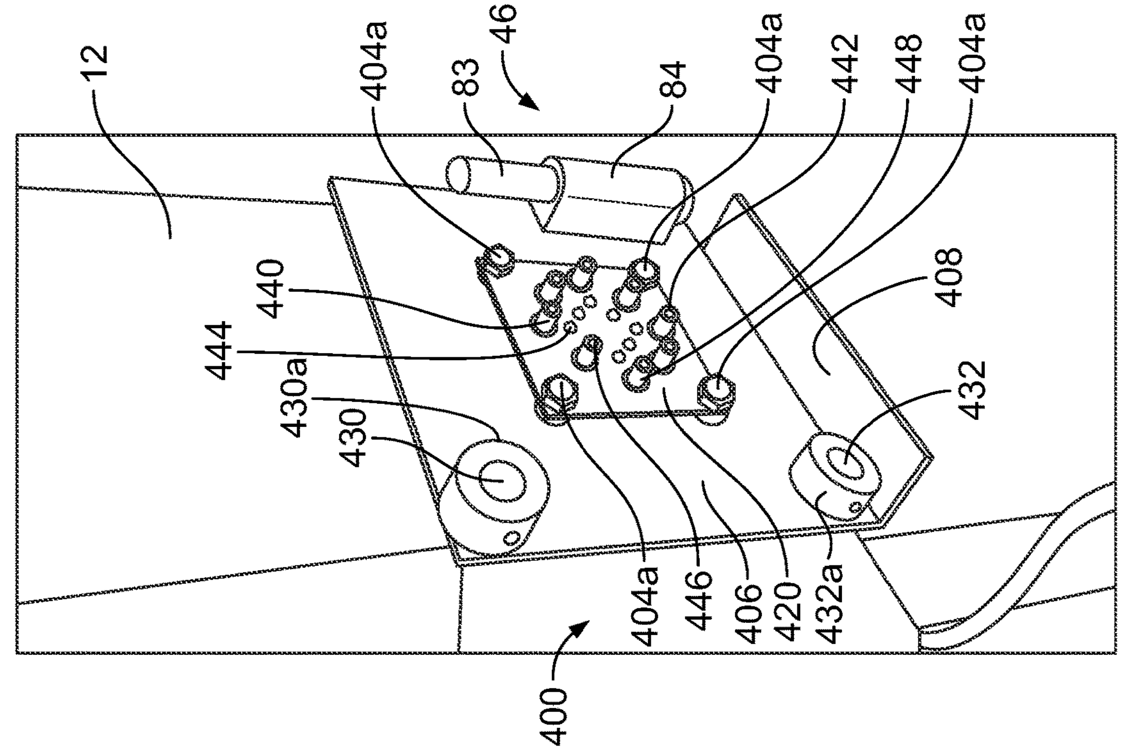
FIG. 27 is a perspective view of base after the arm has been unhinged, according to an example embodiment.
Figure 26:
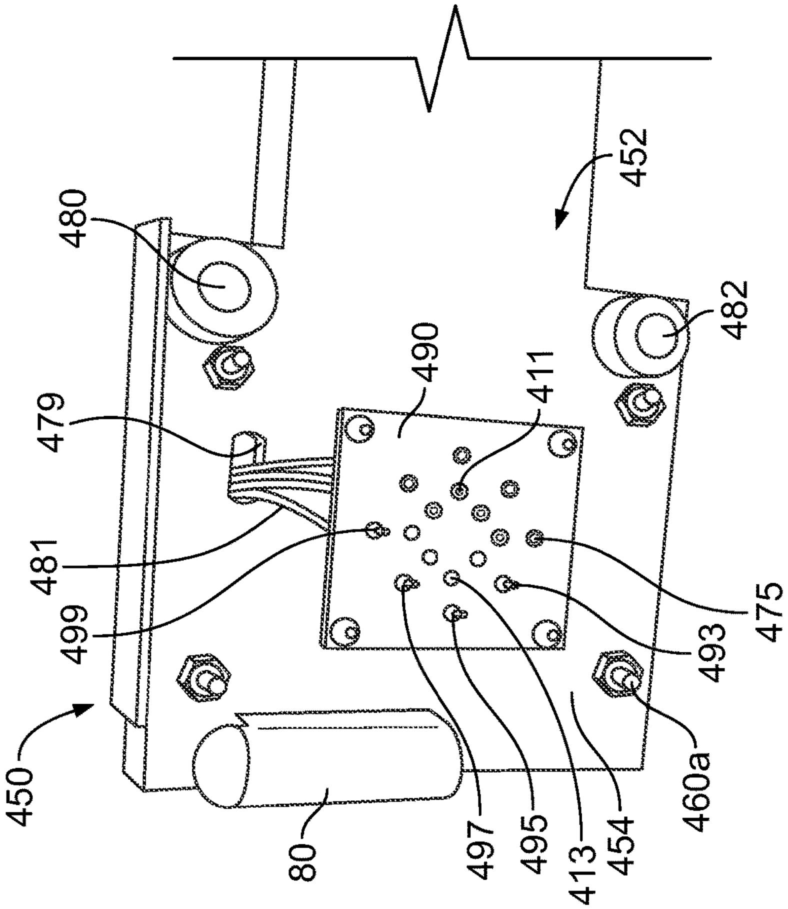
FIG. 26 is a perspective view of an end of the arm after it has been unhinged from the base, according to an example embodiment.
Figure 28:
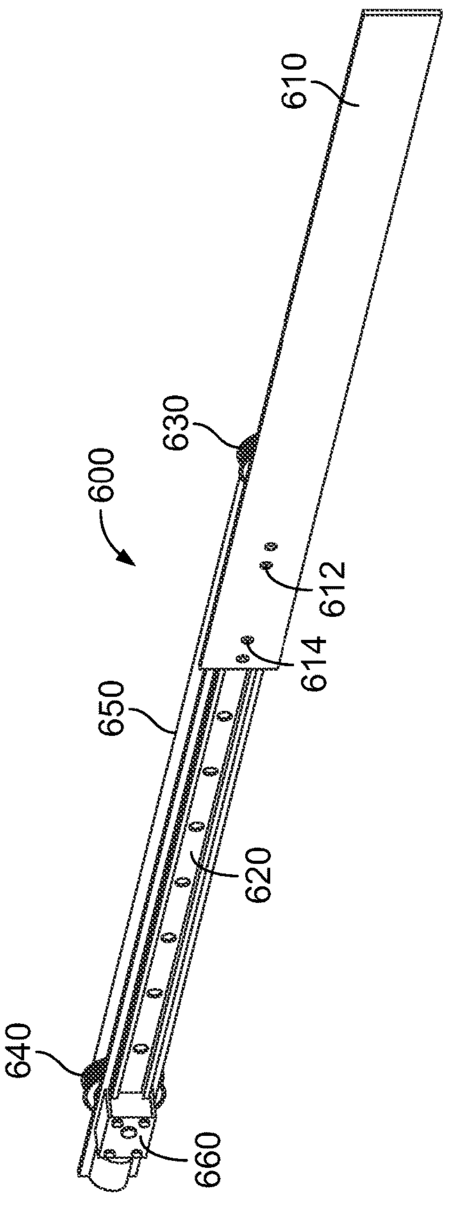
FIG. 28 is a perspective front view of extendable arm 600, according to an example embodiment.
Figure 29:
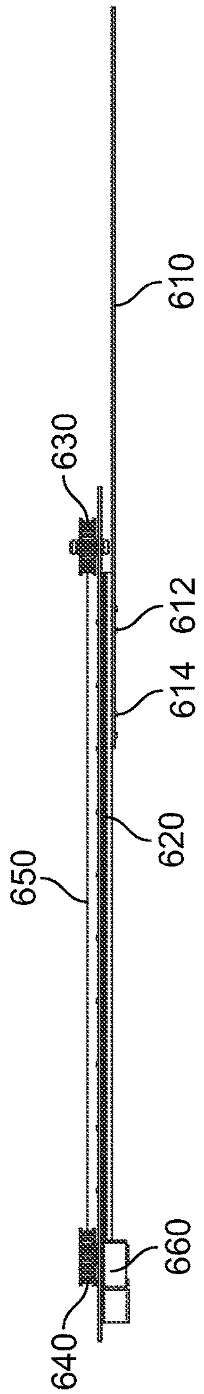
FIG. 29 is a top view of the extendable arm 600 shown in FIG. 28.
Figure 30:
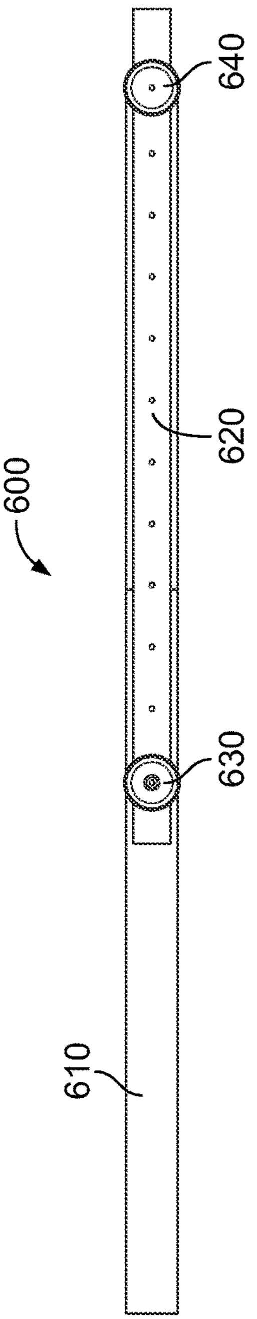
FIG. 30 is a rear side view of the extendable arm 600 shown in FIGS. 28 and 29.

FIG. 5B shows a weld-on hinge 46. In the embodiment shown in FIGS. 3 and 4A, the support plate 58 includes weld-on hinge 46. Weld-on hinge 46 comprises a first upper section 80 and a second lower section 84. A smaller internal cavity 82 is located within the first upper section 80. Each of the first section 80, the second section 84 and the internal cavity 82 are shown capped with a half-spherical body 86. As discussed in greater detail below, the weld-on hinge 46 facilitates the separation of the arm 22 from the base plate 58 in the event of an emergency. As shown in FIGS. 15 and 16, lower hinge section 84 has a welding surface 84*a* that is welded to an arm mount plate on arm 22. Similarly, upper hinge section 80 has a welding surface that is welded to a quick release plate attached to the base 12 (as shown in FIGS. 25-27). When the arm 22 is positioned on the base 12, a cavity 82 of upper hinge section 80 fits over male extension 83 that extends upwardly from lower hinge section 84. As described further with respect to FIGS. 25-27, to remove the arm 22 from the base 12, the arm is moved upwardly to lift the cavity 82 off of male extension 83 to separate the upper hinge section 80 from the lower hinge section 84, and in turn separating the arm 22 from the base 12.

As noted, the lower section 84 of the hinge 46 is mounted to a plate that is attached to the base 12, with the upper section 80 of the hinge 46 mounted to a plate that is on the back of whatever arm is being utilized. The hinge 46 allows for the arm to swing parallel to the ground and into an operational closed position at which point vinyl or plastic screws or bolts may be used to "sandwich" the plates together to hold the arm in position during operation. In the event of an emergency, where a quick exit from the room is required, the screws or bolts may be designed to flex or fail when outward pressure is placed on the rear side of the arm 22 thereby allowing the arm 22 to swing outwardly and rotate parallel to the ground to allow for an emergency exit from the room. The location of the screws may be positioned at location 88 as shown in FIG. 3.

FIG. 6A shows an embodiment of the arm 22 having arm base segment 90. The arm base segment 90 may be used in a non-telescoping arm embodiment, where a vinyl illuminated cover may be used thereon. Lighting, such as LED lighting arrays may be positioned beneath the cover to provide for the illumination of the warning indicia 24 of the arm 22. In one embodiment, the cover may be an etched acrylate. The base segment 90 includes a fulcrum point 93, which attaches the base segment 90 to the base 12 as shown in FIG. 2.

The room access control system 10 may include an extending arm or telescoping arm. As noted above, in its undeployed state, the arm 22 is oriented in a generally vertical position above or below the base 12. In one embodiment, upon deployment of the arm 22 to its deployed, generally horizontal position, the arm 22 first pivots upwardly (or downwardly) to the generally horizontal position. Once in the generally horizontal position, an arm extension of the arm 22 may thereafter be extended to increase the length of the arm to cover the width of the door. In other embodiments, the extension of the arm extension may occur during movement of the arm 22 to the generally horizontal position.

As shown in FIG. 6B, an example embodiment of an extending arm or telescoping arm including arm extension 94 is shown. The arm extension 94 may include an aperture 96 designed to receive the extending mechanism described herein. The arm extension 94 is shown with opposing rails 98 designed to be removably and slidably received by the rails 92 of the base segment 99. The attachment point 96 may be attached to the end 106 of the actuator 100 shown in FIG. 6C, and may extend upon activation. The actuator 100 may be positioned within and covered by the base segment 99, so that the actuator is covered at all times and is more visible upon deployment and resides within the interior of arm extension 94 when not extended.

Figure 6C:
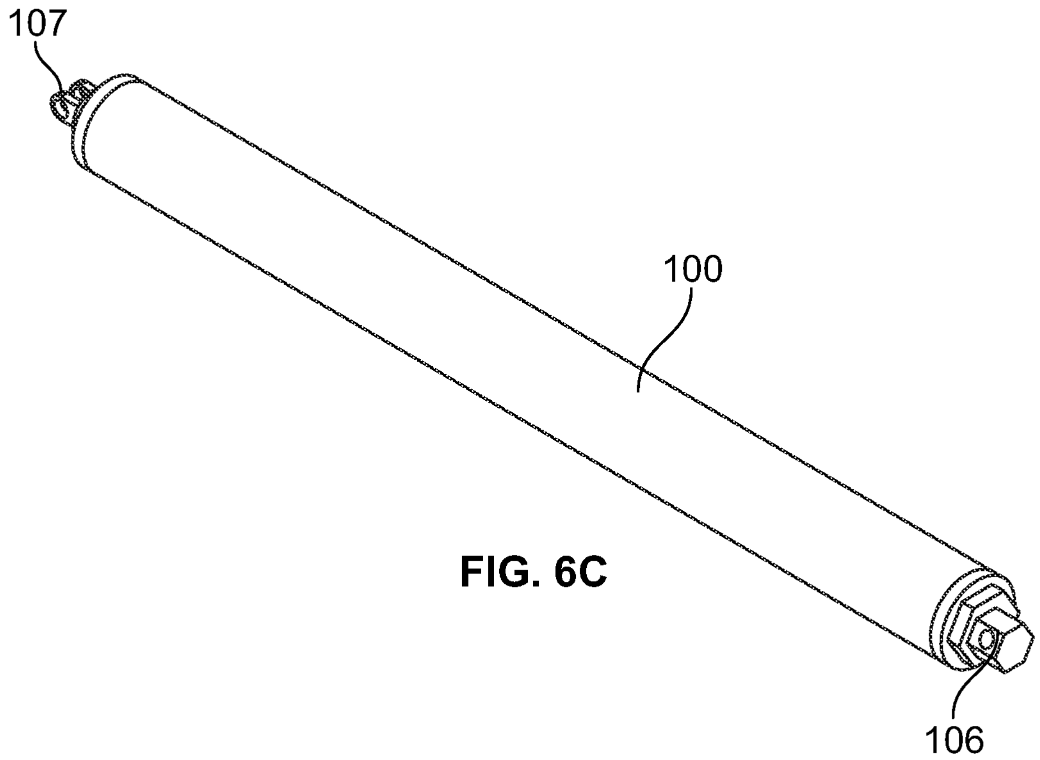
FIG. 6C is a perspective view of a linear actuator 100 that may be used with a telescoping arm, in accordance with features of an example embodiment.

As shown in FIG. 6C, a linear actuator 100 may be used as the device used to extend the arm extension 94. In this embodiment, the linear actuator may be attached to the fulcrum point of the base segment 90 and the aperture 96 of the extension 94. As shown in FIG. 6B, the end 106 of actuator 100 is attached at point 96 of arm extension 94, while end 107 is attached to point 97 of base segment 99. Upon activation of the linear actuator 100 the extension 94 moves along the rails 92 of the base segment 90 to increase the overall length of the arm.

Other actuators may be used as well, for example a cylinder could be used to extend and retract the arm extension 94. Alternately a motor could be used where rotary motion is converted to linear movement during the extension and retraction of the arm extension 94. For example, a rotary motor, such as a servo motor, could be used in connection with a pulley system or a spring loaded system that could be used to extend and retract the arm extension.

Figure 31:
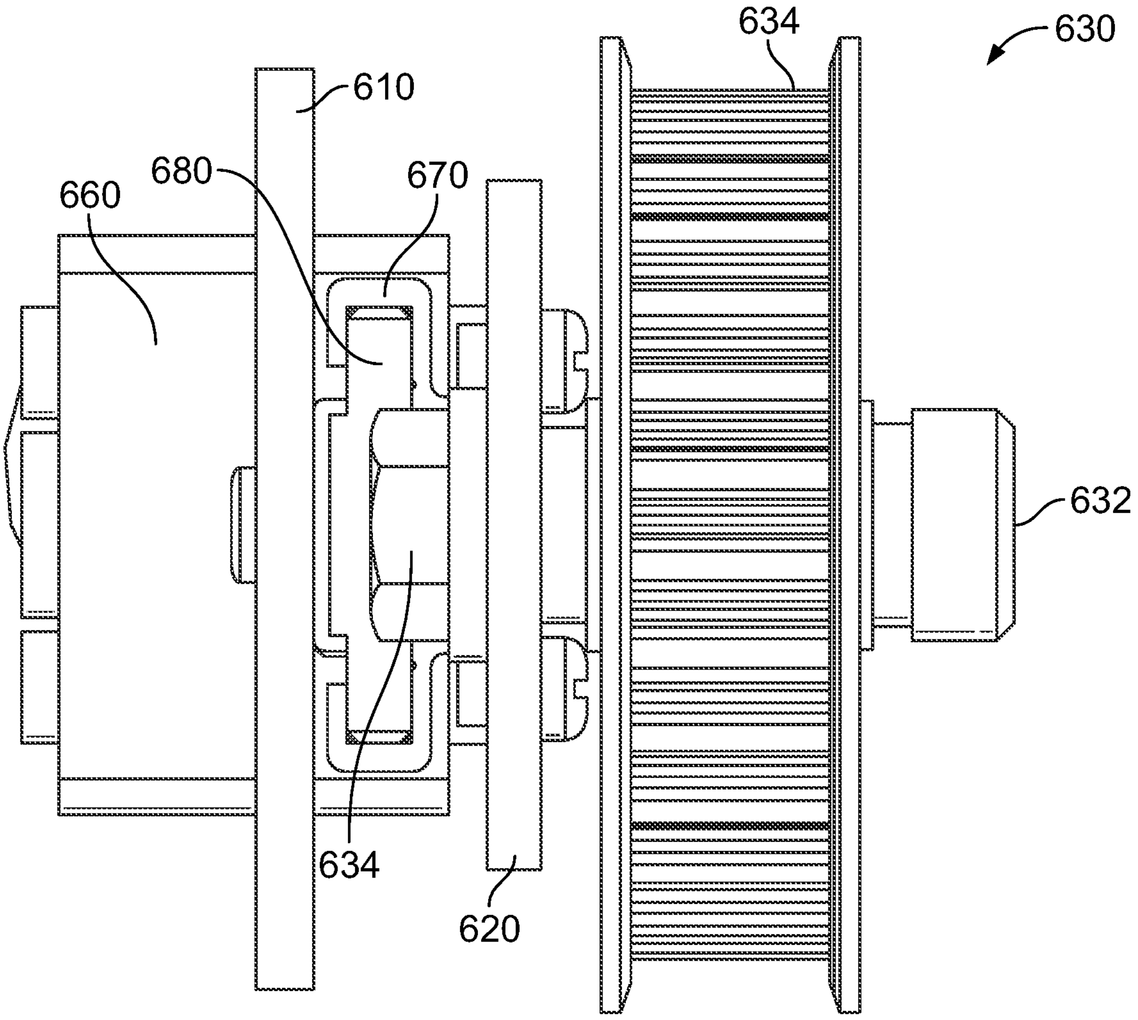
FIG. 31 is an end view of the extendable arm 600 shown in FIGS. 28-30.

As an example, extendable arm 600 is shown in FIGS. 28-31. Extendable arm 600 include arm 620 and arm extension 610 that is extendable from arm 620. Pulleys 630 and 640 are mounted on the rear side of arm 620. A string or belt 650 extends from pulley 630 to pulley 640. A servo motor 660 is drivingly attached to pulley 640. Mounting fasteners 612 and 614 are used to mount to rail guide 680 (shown in FIG. 31). As shown in FIG. 31, rail guide 680 rides within guide rails 670 positioned on the rear side of arm 620. In FIG. 31, pulley 630 is mounted to arm 620 and secured with nut 634.

Servo motor 660 is secured to pulley 640 and is used to cause rotational movement of pulley 640 which in turn causes rotation of pulley 630. The arm extension 610 may be attached to the belt 650 to cause the extension/retraction of the arm extension 610 as the belt is moved around pulleys 630 and 640. Alternately, a rack may be attached to arm extension 610 and positioned beneath pulley 630 such that rotation of pulley 630 causes the linear movement of the rack and in turn the linear extension of arm extension 610. Variations on the use of pulleys and a servo motor to provide for the linear extension of arm extension 610 may be used as well. For example, pulley 630 could be mounted to arm extension 610 and spring loaded to bias the arm extension 610 into an extended position. During the undeployed state, the spring would be in a compressed state, and during the extension of the arm extension 610, the servo motor 660 could rotate pulley 640 to lengthen the string, and the spring would force the arm extension 610 outwardly to its extended position. Alternately, a third pulley could be secured to the arm extension 610 and positioned between pulley 640 and 630. The third pulley could have notches similar to notches 634 of pulley 630 such that rotation of the servo motor would cause pulley 640 to rotate and drive the belt and in turn rotate the third pulley thereby imparting linear motion to the arm extension.

In addition, it is also possible that pulley 640 could be geared to the rotation of the arm 610 when the arm 610 is rotated from its undeployed, generally vertical state to its deployed generally horizontal state. For example, a gear could be positioned on the end of the rotating shaft 378 of motor 370 (shown in FIG. 19) that is used to drive the pulleys 350 and 360 (shown in FIGS. 17 and 18). Another gear may be positioned adjacent pulley 640 that is sized such that when the arm 610 is rotated 90 degrees into its deployed state, the rotation of the gear attached to pulley 640 is rotated to extend the arm extension a desired length to extend across a doorway. In some embodiments, the arm extension may extend a distance of 14 inches. With this configuration, the arm extension 610 extends during deployment of arm 620 such that when arm 620 reaches its deployed generally horizontal state, the arm extension 610 is in its extended position.

Figure 6D:
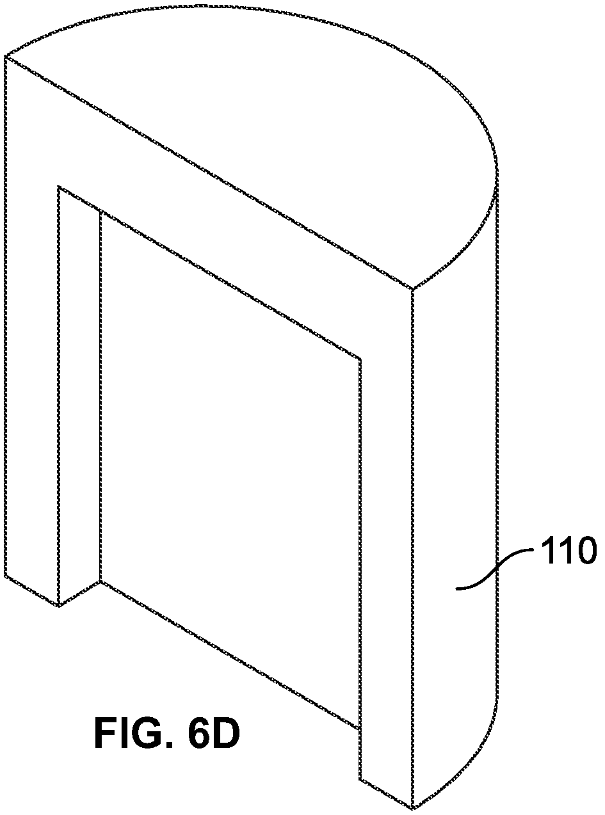
FIG. 6D is a perspective view of a foam tip 110 that may be used as a component of the telescoping arm, in accordance with features of an example embodiment.

FIG. 6D depicts a foam tip 110 that may be positioned at the end of the arm 22. In one embodiment, the extension 94 continues to extend outwardly away from the base segment 90 until the foam tip 110 touches an opposing surface, such as a door or wall frame. The foam tip 110 may, but preferably does not, include a sensor. Instead, the linear actuator 100 is sensitive to the resistance from the foam tip 110 and will stop extending the extension 94 upon encountering resistance on the foam tip 110. The arm extension 94 therefore does not require any sensor or switch, instead it is capped with a simple foam tip 110 thereby avoiding complicated circuitry within the telescoping arm. A counterweight may be positioned on an end of the arm extending past the pivot point of the arm 22 to provide greater balance and reduce the torque required to rotate the arm. The use of a counterweight may be particularly beneficial when the arm 22 includes an arm extension 94.

Figure 7:
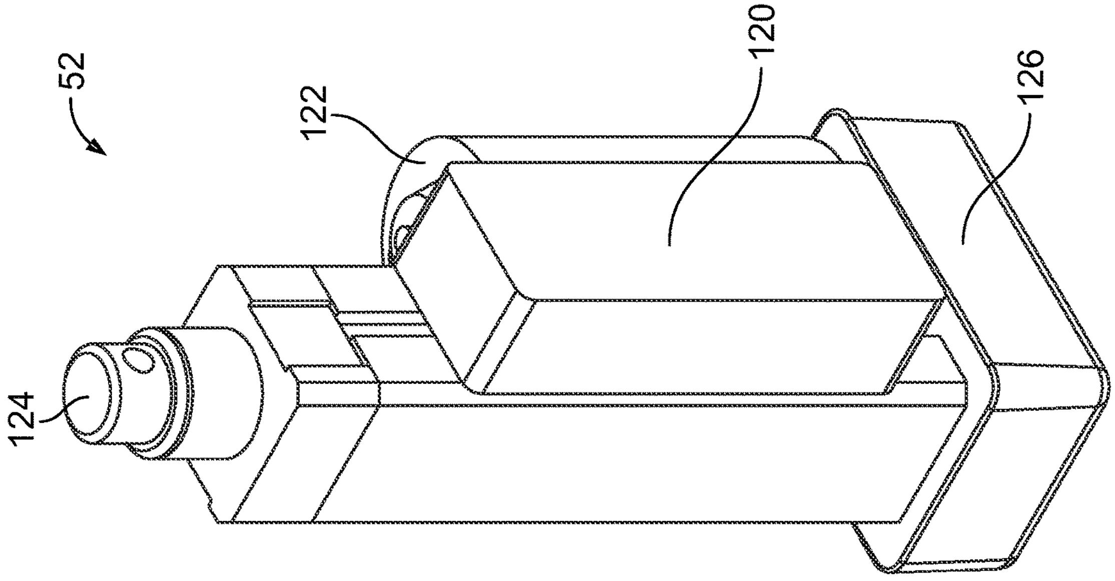
FIG. 7 is a perspective view of the linear drive 52 shown in FIGS. 3 and 4A, according to an example embodiment.

FIG. 7 depicts an additional view of the linear drive 52 that is positioned within the base 12 and used to rotate the arm 22. The linear drive 52 converts the rotational movement of the motor into a linear movement which is used to extend the telescoping arm. The linear drive 52 includes a control enclosure 120, the motor 122, and the linear drive element 124. The linear drive 52 is attached to the base 12 at the linear drive pedestal 126. In one embodiment, the linear drive 52 is a drop-in replaceable component with a mean time between failures of 20,000 cycles. In one embodiment, a linear drive from Duff-Norton Corporation, Model: TMD01-1906-D is used as the driving module.

Figure 8:
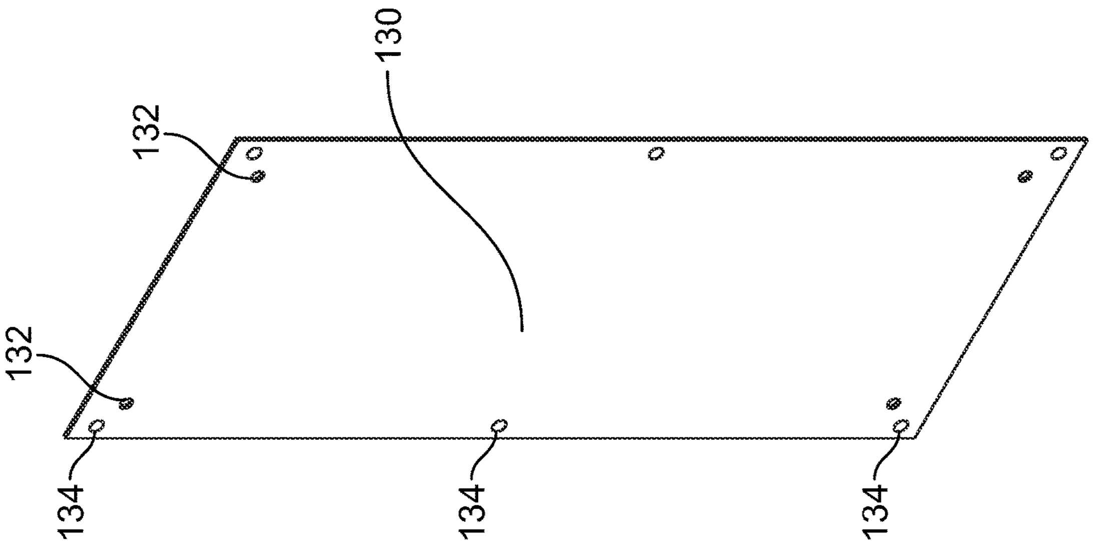
FIG. 8 is a perspective view of mounting plate 130 that may be used as wall plate 16 shown in FIG. 2, in accordance with features of an example embodiment.

FIG. 8 depicts a wall mounting plate 130 pursuant to an example embodiment. As shown in FIG. 8, the mounting plate 130 may be used as wall plate 16 shown in FIG. 2, and may be attached directly to the wall, using apertures 134 which are adapted to receive any standard dry wall anchor, screw etc. The base 12 in turn is connected to the mounting plate 130 through apertures 132, which in an example embodiment may be threaded posts. The apertures 134 may be spaced to correspond to locations of reinforcement studs within a standard commercial wall. In another embodiment, the apertures 134 are shaped to allow for mounting of different threaded members, such as ones optimized for anchoring to brick, drywall, metal, and wood studs. It will be appreciated that inasmuch as the MRI systems must be electrically isolated from electromagnetic interference, MRI enclosures are typically encased in ferrous materials. As such, a magnetic mounting system used for mounting directly to the enclosure surface is a suitable alternative, particularly in instances where one system is to be used in different locations on the fly.

FIG. 9 depicts an alternative embodiment of support bracket 140 using a welded "L" support bracket shape that may be used to support base 12. The alternative support bracket 140 uses affixment points 142 on a first face 144. These affixment points 142 are for wall mounting. Further, a second face 148 of the bracket 140 includes threaded studs 146 for mounting on the base of the product. Finally, the bracket 140 includes a third reinforced angle section 149 for support.

Figure 10:
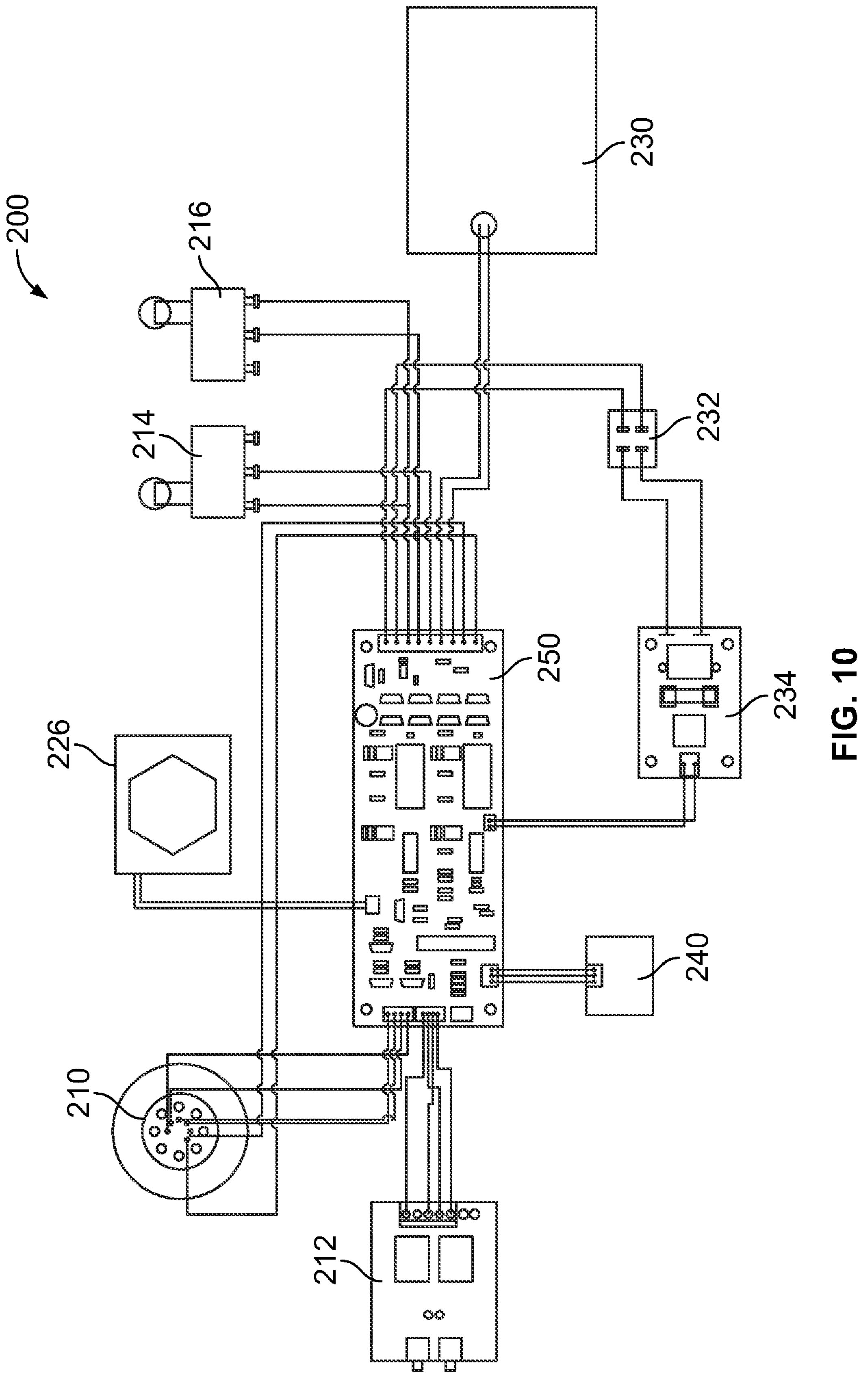
FIG. 10 is a schematic wiring diagram 200 for the access control system 10, according to an example embodiment.

FIG. 10 shows a schematic wiring diagram 200 that may be used in room access control system 10 showing various components that are electrically connected to circuit board 150. In particular, DC gear motor 230 that may be used with pulleys 350 and 360 (shown in FIGS. 17 and 18) to cause rotation of arm 22 is shown connected to circuit board 250. DC gear motor 230 may be a 17.8 rpm, 12V, TENV DC Gear motor having part number 7CA51 available from Grainger.

Limit switches 214 and 216 are also connected to circuit board 250, and may be a SW Plunger SPDT 15A SCRW Term 125V having part number BZ-2RQ18-A2 available from Digi-Key. Rocker switch 232 is shown connected to circuit board 250 and power switch 234 also connected to circuit board 250. Rocker switch 232 may be Part Number MENB1080A1251F01 also available from Digi-Key. IR sensor 240 is also connected to circuit board 150 and may be Part Number 1351E-6517 available from Automation Direct. Arm printed circuit board 210 and RF Receiver 212 which may have Part Number SK-910RBQ available from Seco-Larm are also connected to circuit board 250, as is LED stop sign 226.

Figure 11B:
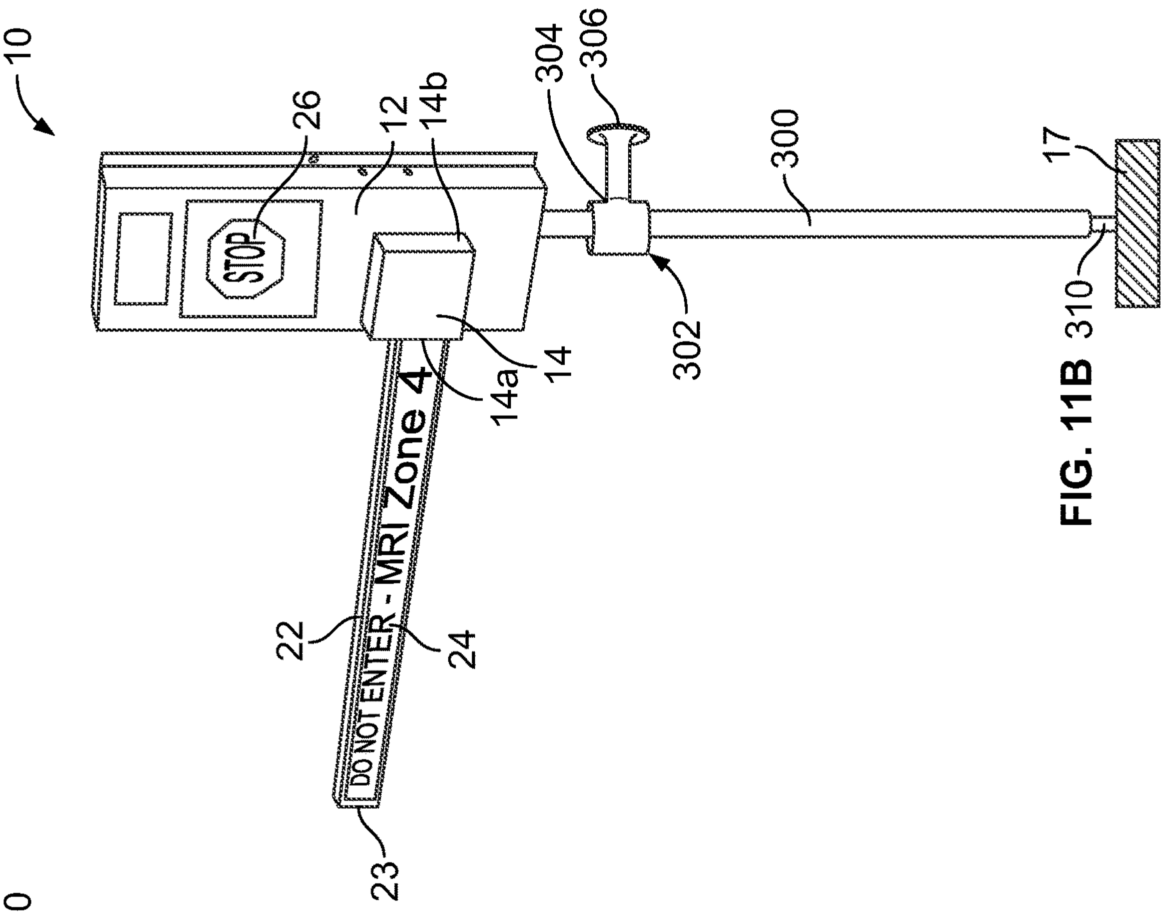
FIG. 11B is a perspective view of the access control system 10 shown in FIG. 11A with arm 22 in a deployed position, according to an example embodiment.
Figure 11A:
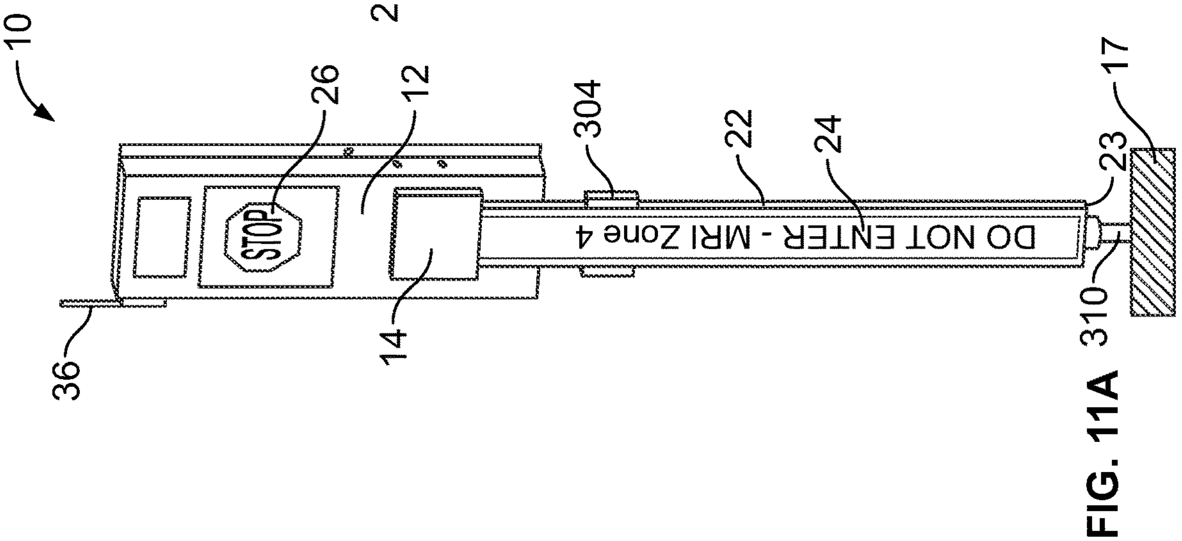
FIG. 11A is a front view of access control system 10 using a pole mount, according to an example embodiment.
Figure 14A:
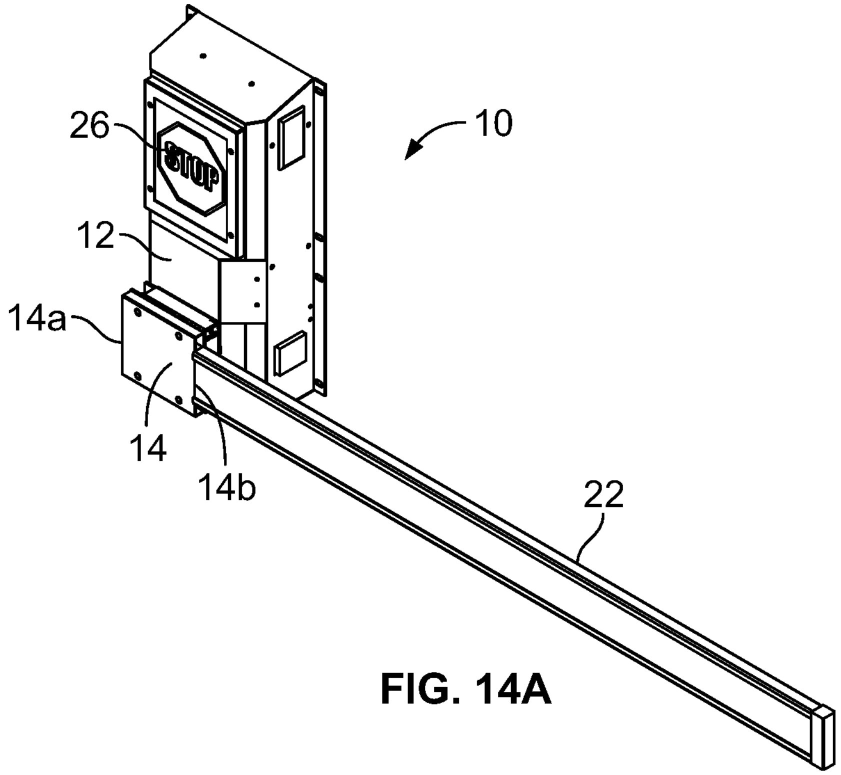
FIG. 14A is a perspective view of access control system 10 with arm 22 extending to the right of base 12, according to an example embodiment.
Figure 14B:
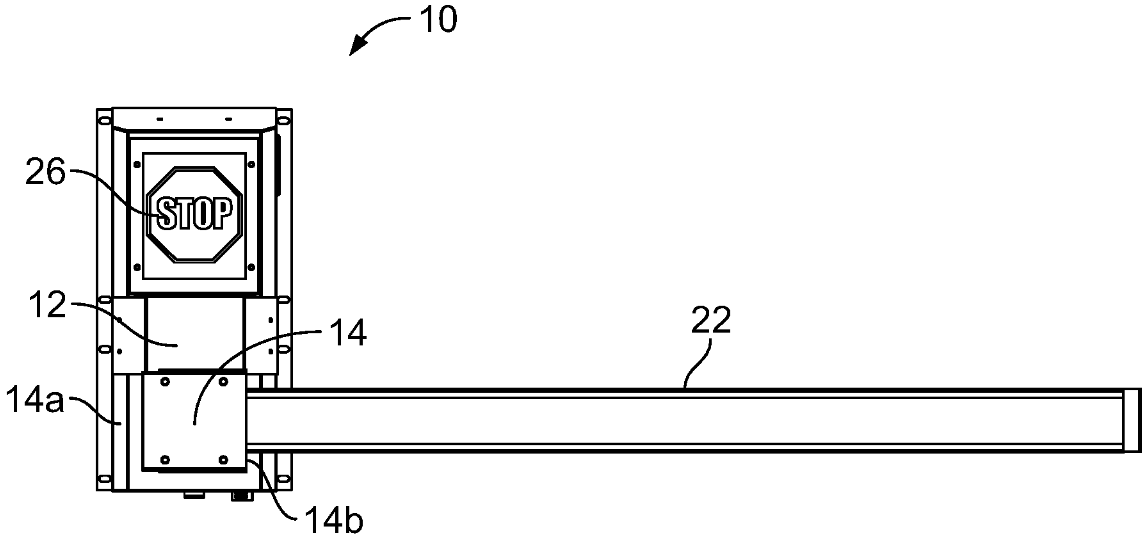
FIG. 14B is a front view of the access control system 10 shown in FIG. 14A.

FIGS. 11A and 11B are views of room access control system 10 mounted on a pole mount. With this configuration, the base 12 remains freestanding while connected to the top of pole 300. Pole 300 has a bottom end 310 positioned above floor 17. Pole 300 may be secured to a wall using wall connector 302 having a sleeve 304 that extends around the outside of pole 300, and a mounting flange 306 through which fasteners may be placed to secure the wall connector 302 to the wall, and in turn secure the pole 300 and base 12 into position. In FIG. 11A, the arm 22 having warning indicia 24 is shown in an undeployed, vertical state, and FIG. 11B shows arm 22 positioned in the deployed, horizontal state where it may extend across a doorway of an MRI suite. In FIG. 11B, the arm 22 is shown extending from the left side 14*a* of arm receptacle 14. Base 12 and arm receptacle 14 may also be configured so that arm 22 extends from the right side 14*b* of arm receptacle, allowing the base to be positioned on either side of a doorway. An example room access control system 10 having an arm 22 extending from the right side 14*b* of arm receptacle 14 is shown in FIGS. 14A and 14B. The arm receptacle 14 may be configured to accept arms on both the left side 14*a* and the right side 14*b* and have the ability to quickly change over from a right side mount configuration to a left side mount configuration, and vice versa.

Figure 13:
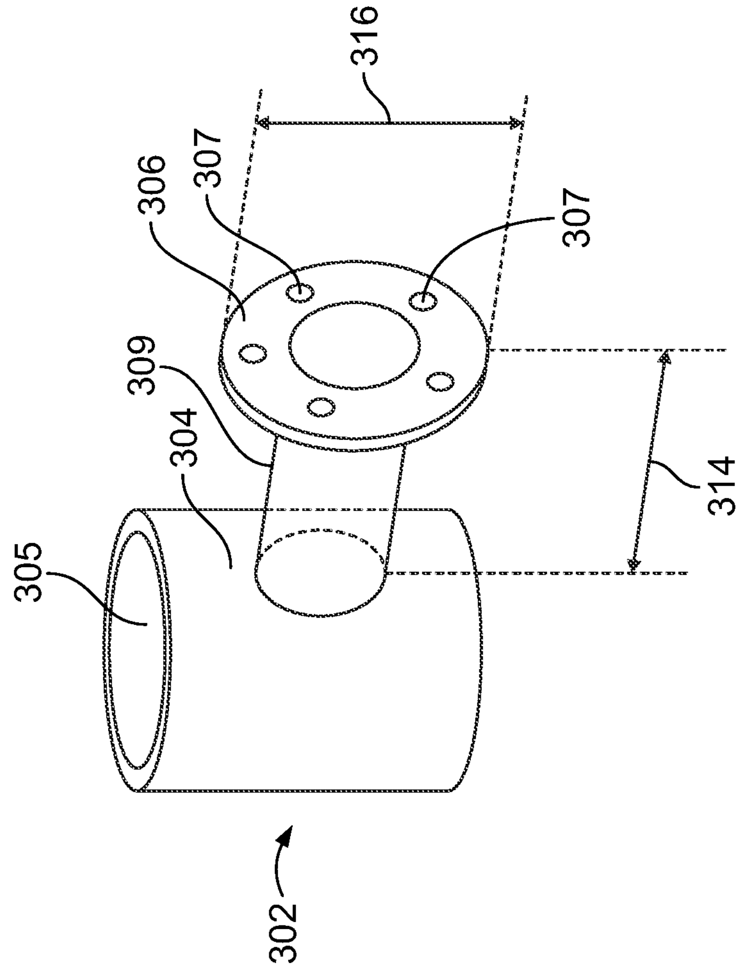
FIG. 13 is a perspective view of the wall connector 302 for the pole mount shown in FIG. 12.
Figure 12:
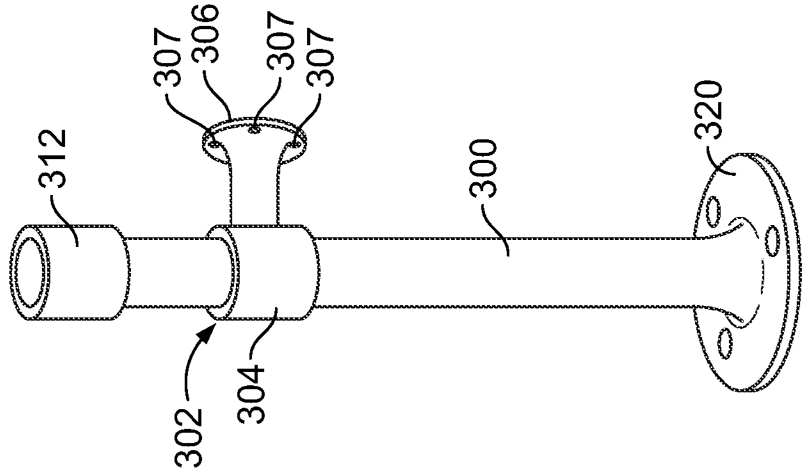
FIG. 12 is a perspective view of the pole mount shown in FIGS. 11A and 11B.

FIGS. 12 and 13 show additional details regarding pole 300 and wall connector 302. In particular, mounting pole 300 may include a base 320 that can be used to secure the pole 300 to the floor 17. Wall connector 302 includes a flush, wall mounting surface 306 with mounting holes 307 that may be used to mount the wall connector to a wall. Wall connector 302 also includes a throughhole 305 that has an inner diameter that is greater than the diameter of pole 300, so that wall connector 302 may be moved up or down on pole 300 until positioned at a desired height. Mounting surface 306 may extend from an end of extension 309 a desired distance 314 from the pole which in some embodiments may be a distance of four inches. Mounting surface 306 may also have desired diameter 316 for mounting to a wall, which in some embodiments may be 3.5 inches.

Positioned at the top of pole 300 is base mount 312 which may be used to mount pole 300 to base 12. Base mount 312 may swivel about pole 310, to position the front of base 12 in a desired position. Base mount 312 may use mating teeth to properly locate the position of the base in a desired position. The base mount may be mounted to the bottom or rear of the base 12. In an example embodiment, the upper portion of the pole 300 may be tapered so that the base mount 312 can slide down the top of pole 300 until the inner diameter of the base mount 312 matches the diameter of the pole, to provide a tight fit between the base mount 312 and pole 300. Other variations are also possible to mount base 12 to pole 300.

In its deployed, horizontal state, arm 22 should be high enough off of the floor 17 so that persons do not step over it and low enough so that persons do not crouch under it. Ideally, the height of arm 22 in its deployed, horizontal state is waist-high, or around 38 inches in height. It will be appreciated, that as shown in FIG. 11A, when the arm is in the undeployed, vertical state beneath the base 12, the end 23 of arm 22 is positioned above the floor 17. Accordingly, in embodiments where the arm 22 extends beneath the base 12 in an undeployed state, the overall length of the arm 22 should not be longer than the height of the arm 22 when it is in the deployed, horizontal state. Thus, where the arm receptacle is positioned 38 inches above the floor, the length of the arm in its undeployed, vertical state must be less than 38 inches in length, otherwise the end 23 of arm 22 would hit the floor 23.

Therefore, it will be appreciated that in embodiments where the arm 22 includes an arm extension, the arm 22, prior to extending the arm extension, should have a length that is less than the height of the arm 22 from the floor 17 when the arm 22 is in its deployed, horizontal state. Because of the vertical limitations imposed by the height of the base and operation indoors, an access control system having an arm that may be positioned beneath the base 12 in an undeployed state has a strict limit on its length. Accordingly, in locations where the width of the doorway is wider than the length of the arm, it may be desirable to employ an extendable arm or telescoping arm so that the arm may extend across the full width of the doorway. Alternatively, a pair of room access control systems 10 could be positioned on both sides of a doorway, to provide a physical barrier across the doorway. The use of a pair of room access control systems 10 may be useful where an extra wide doorway is used, and where the arms of the system may be beneficially synched to deploy and/or retract simultaneously.

In some embodiments, one or more lasers may be positioned on the arm that are pointed upward and/or downward to provide a laser curtain that may indicate whether someone has bypassed the arm. In some applications bars or mesh could extend above or below the arm to provide a further physical barrier to entry.

Figure 17:
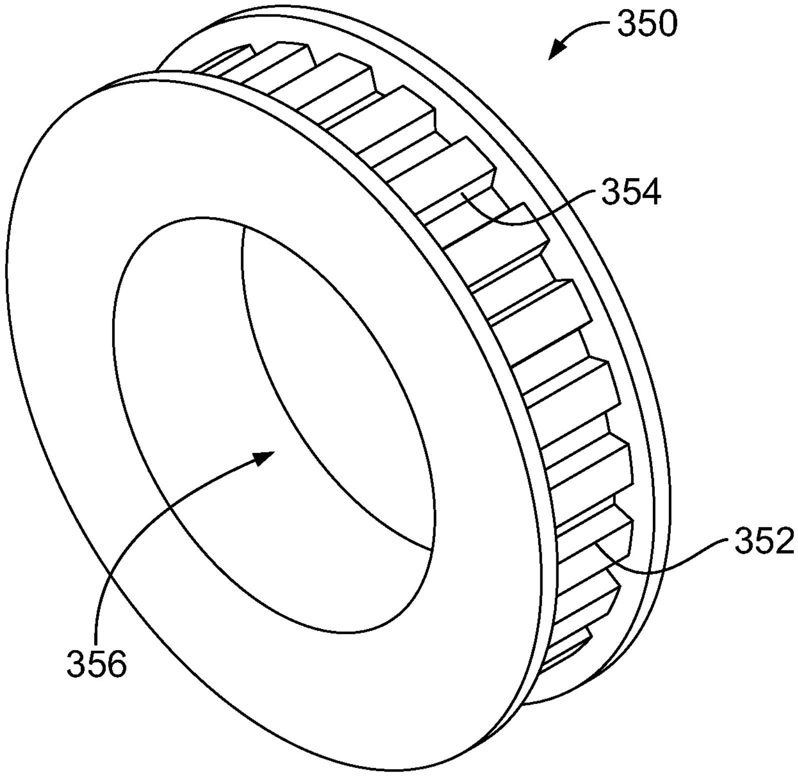
FIG. 17 is a perspective view of pulley 350, according to an example embodiment.
Figure 19:
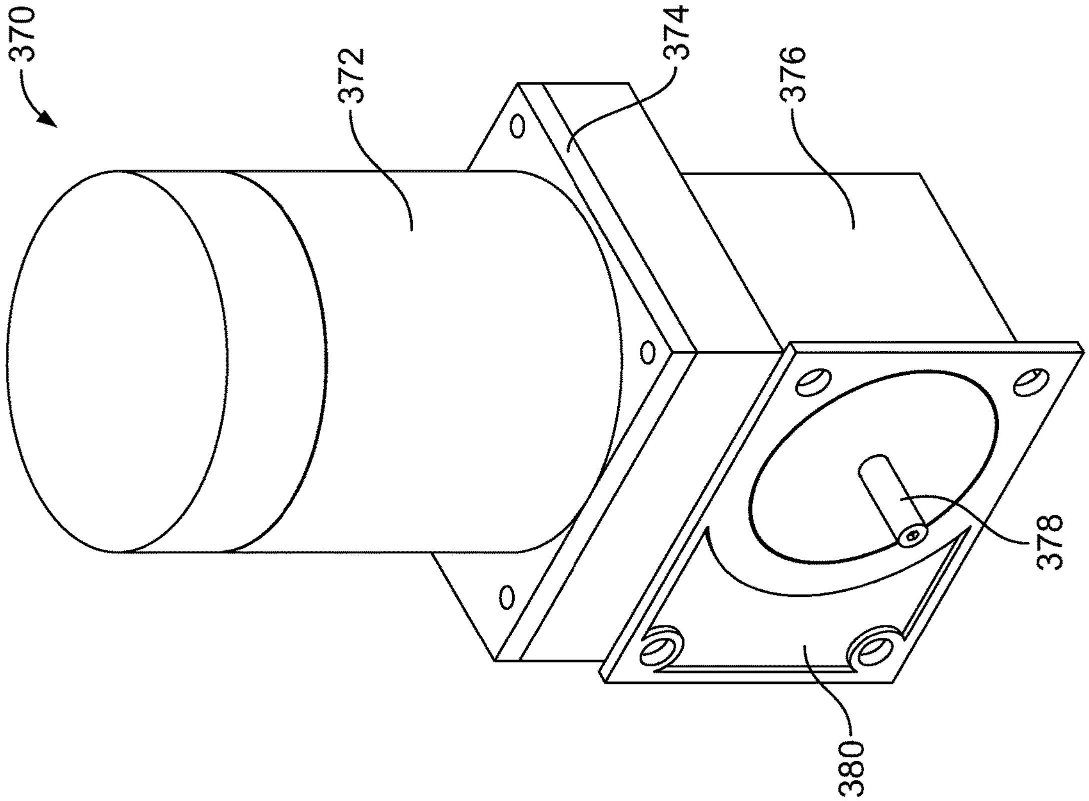
FIG. 19 is a perspective view of motor assembly 370, according to an example embodiment.
Figure 18:
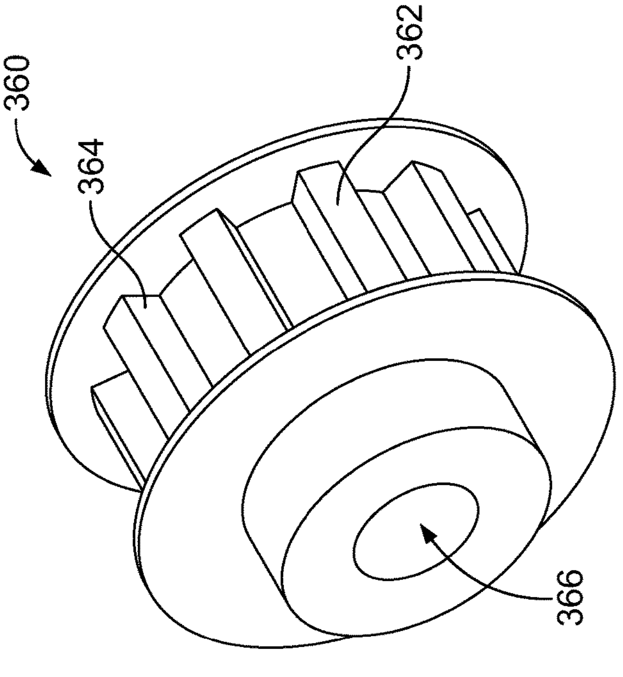
FIG. 18 is a perspective view of pulley 360, according to an example embodiment.

As noted above, the rotation of arm 22 may be caused by the extension of a linear actuator attached to a plate with an offset attachment so that rotation of the plate in turn causes rotation of the arm (see FIGS. 4B and 7). There are other ways to rotate the arm 22 as well. For example, a motor have a keyed axle could be used to rotate the arm having a corresponding keyway. In addition, a motor may be used in connection with pulleys and a drive belt to cause rotation of the arm. In particular, as shown in FIGS. 17-19, a motor 370 (which may be a DC gear motor) may be used in connection with pulleys 350 and 360 to cause the arm to rotate. Motor 370 may include a housing 372 enclosing inner components therein positioned on a base 374 and housing 376. Motor 370 may include a mounting face 380 and a rotatable axle 378 which may extend into aperture 366 of pulley 360. A drive belt (not shown) extends over pulley 360 and cooperates with notches 362 and 364 which move the drive belt which also extends over pulley 350 where the belt cooperates with notches 352 and 354 of pulley 350 to rotate pulley 350. Pulley 350 is secured directly or indirectly to the end of arm 22, such that rotation of axle 378 causes pulley 360 to rotate, which in turn through a drive belt causes pulley 350 to rotate, which in turn causes the arm 22 to rotate. Other ways of rotating the arm 22 may also be employed.

Figure 20:
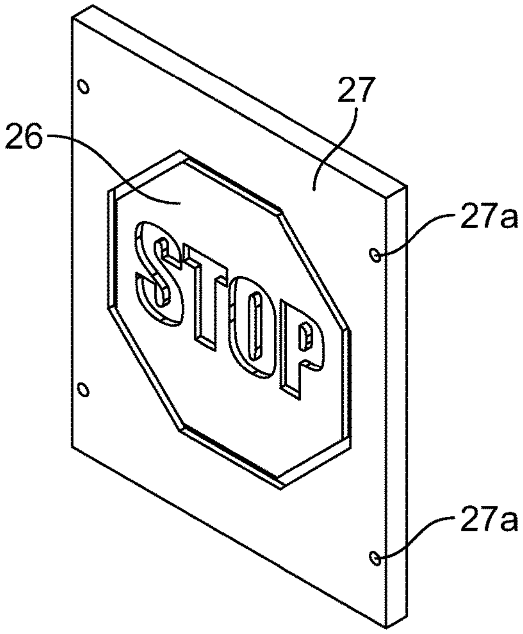
FIG. 20 is a perspective view of warning plate 27, according to an example embodiment.

FIG. 20 shows warning plate 27 that includes warning indicia 26, which may be in the form of a "STOP" sign. Plate 27 may be attached to base 12 by placing fasteners through holes 27*a* on plate 27.

Figure 21A:
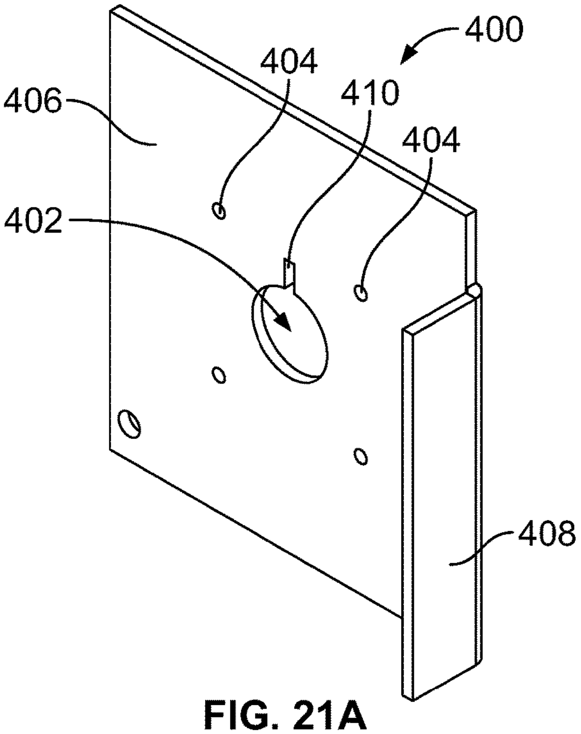
FIG. 21A is a perspective view of arm mount plate 400, according to an example embodiment.
Figure 21B:
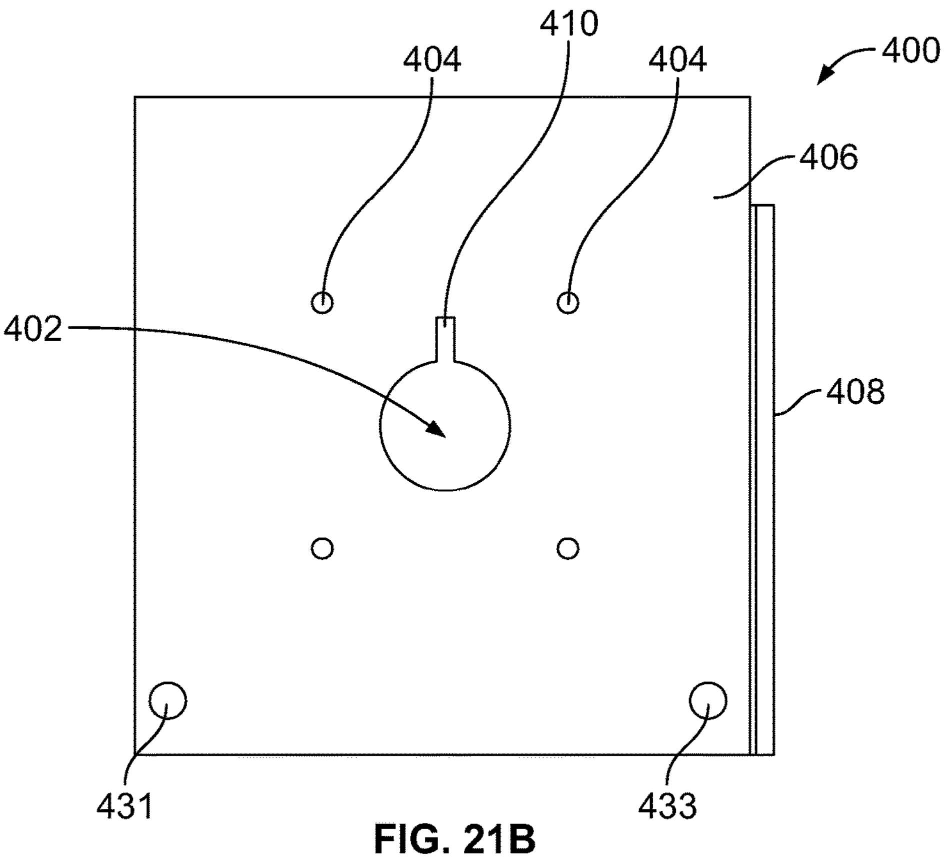
FIG. 21B is a front view of the arm mount plate 400 shown in FIG. 21A.

FIGS. 21A and 21B are views of arm mount plate 400. Arm mount plate 400 is secured to the rotating portion of base 12, and may be secured to a portion of arm receptacle 14. Arm mount plate 400 includes major flange 406 and arm support bracket 408 which in operation is positioned beneath arm 22 and provides an additional support for arm 22. Mounting holes 431 and 433 are used to mount magnets (430 and 432 shown in FIG. 25) that are used to secure arm mount plate 400 to quick release plate 450 (shown in FIG. 25) which is in turn mounted to the end of arm 22. Arm mount plate 400 includes a throughhole 402 having a keyway 410 through which a shaft rotated by pulley 350 may be positioned to impart rotational motion to arm mount plate 400, and in turn to arm 422. Arm mount plate 400 also includes mounting holes 404 that are used for mounting a first circuit board 420 (shown in FIG. 25) to the arm mount plate 400.

Figure 22A:
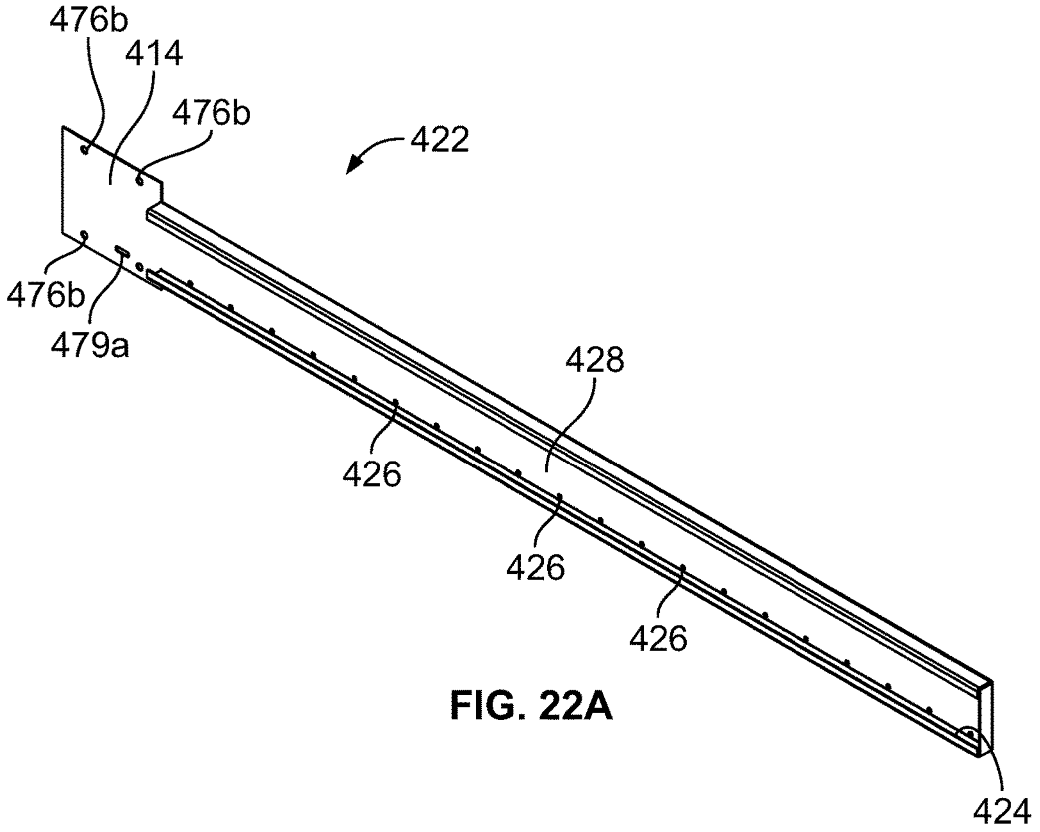
FIG. 22A is a perspective view of arm 422, according to an example embodiment.
Figure 22B:
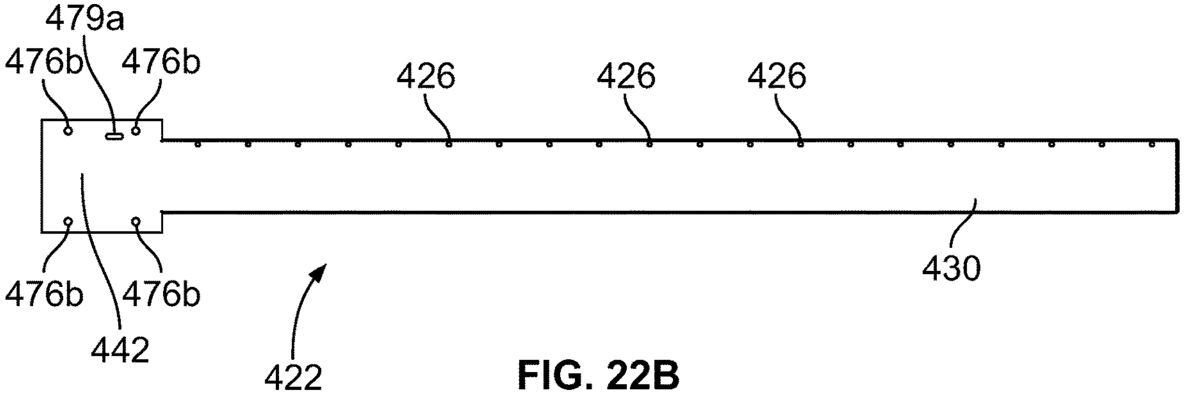
FIG. 22B is a rear view of the arm 422 shown in FIG. 22A.

FIGS. 22A and 22B show an example embodiment of arm 422 that can be used as arm 22 in room access control system 10 described above. Arm 422 includes mounting holes 476*b* positioned on arm end flange 414 to allow for mounting with quick release plate 450 described below. Arm 422 also includes throughhole 479*a* that allows wiring to extend through arm end flange 414 to a second printed circuit board that is secured to arm end flange 414 and quick release plate 450 (shown in FIG. 25).

FIG. 22A shows front side 428 of arm 422 where lighting, such as LED light arrays may be positioned to illuminate warning indicia positioned on the front side 428 of arm 422. In addition, as shown in FIG. 22B, the rear side 430 of arm 422 includes a plurality of apertures 426 through which light emitted from the LED light arrays passes through, to provide illuminated rear indicators that provide a visual signal to let MRI technicians see that the arm is positioned in a deployed state to provide a physical barrier to safely secure the MRI suite.

Figure 23B:
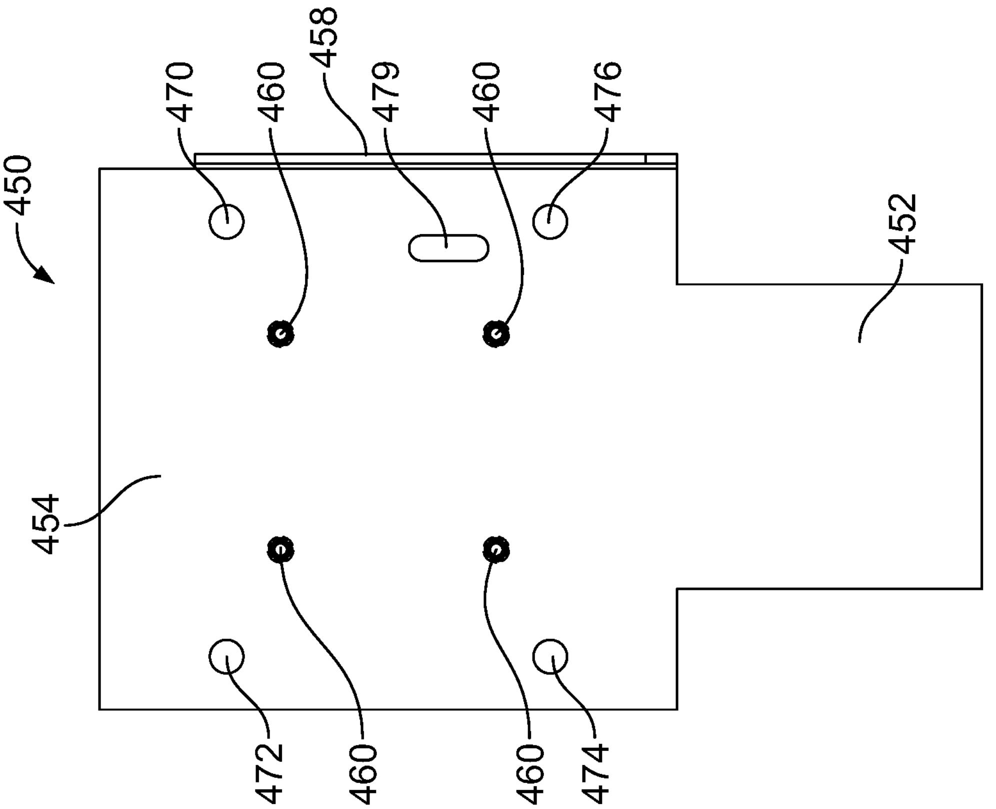
FIG. 23B is a front view of the quick release plate 450 shown in FIG. 23A.
Figure 23A:
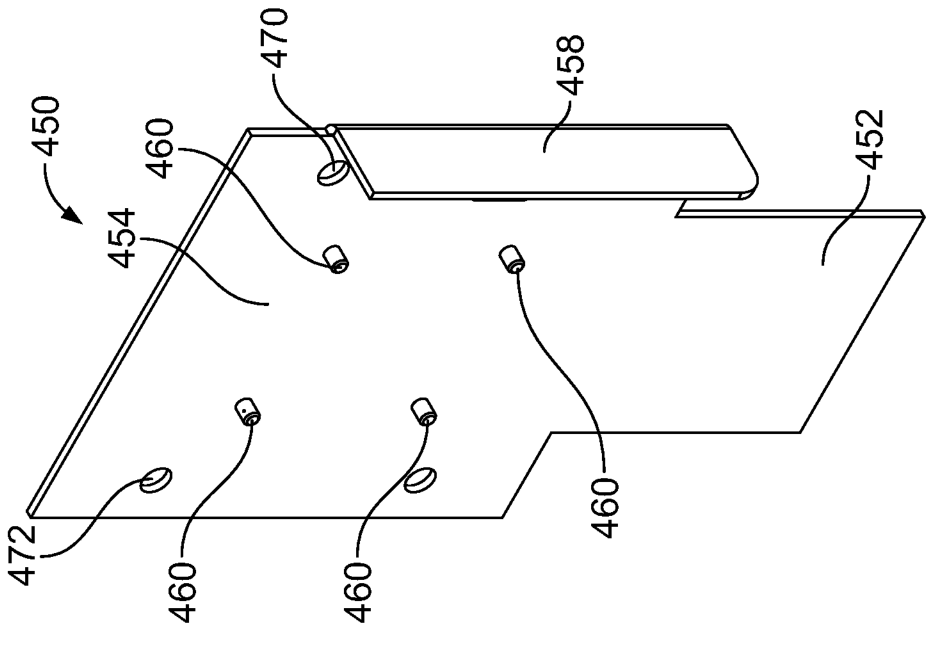
FIG. 23A is a perspective view of quick release plate 450, according to an example embodiment.

FIGS. 23A and 23B show views of quick release plate 450 that may be secured to an end of the arm of room access control system 10. Quick release plate 450 includes mounting holes 470, 472, 474, and 476 in main flange 454 that are used to mount quick release plate 450 to arm end flange 414 of arm 422. Quick release plate 450 also includes mounting holes 460 that are used to mount a second printed circuit board 490 (shown in FIG. 25) to main flange 454 of quick release plate 450. Throughhole 479 is positioned on main flange 454 to allow for the passage of wiring from the second printed circuit board 490 to the LED light arrays positioned within arm 422. Flange 452 extends in the direction of arm 422 when mounted to arm 422. Quick release plate 450 also includes a top flange 458 that extends over the first and second printed circuit boards when the arm 422 is in its normal deployed state.

Figure 24C:
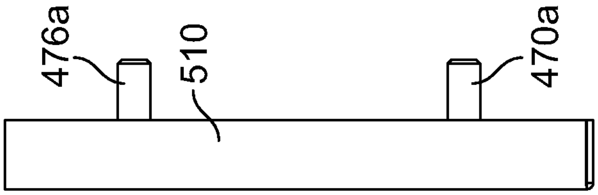
FIG. 24C is a side view of arm clamp 500 shown in FIGS. 24A and 24B.
Figure 24B:
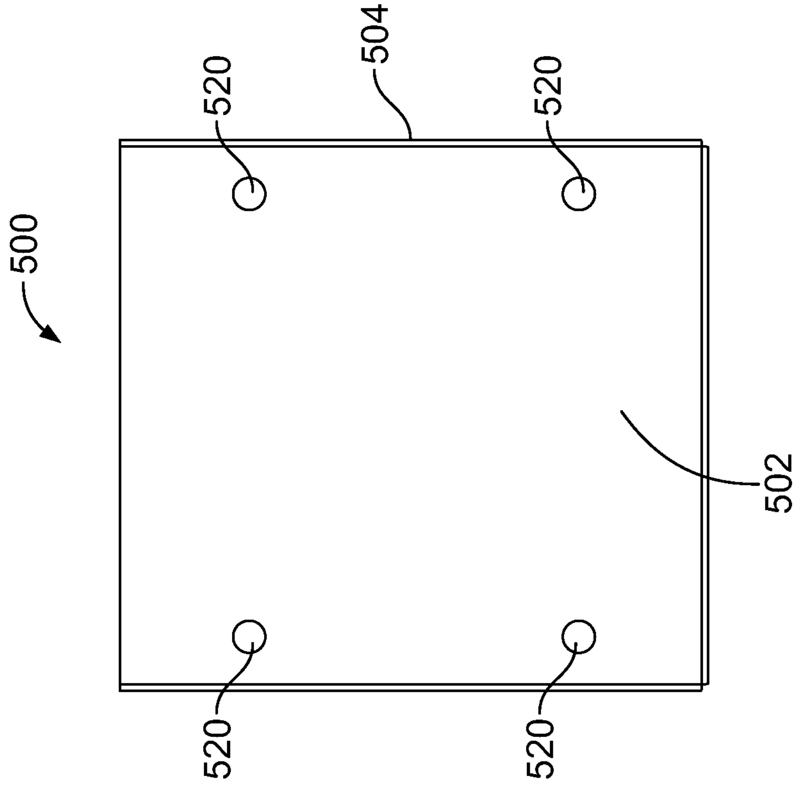
FIG. 24B is a front view of the arm clamp 500 shown in FIG. 24A.
Figure 24A:
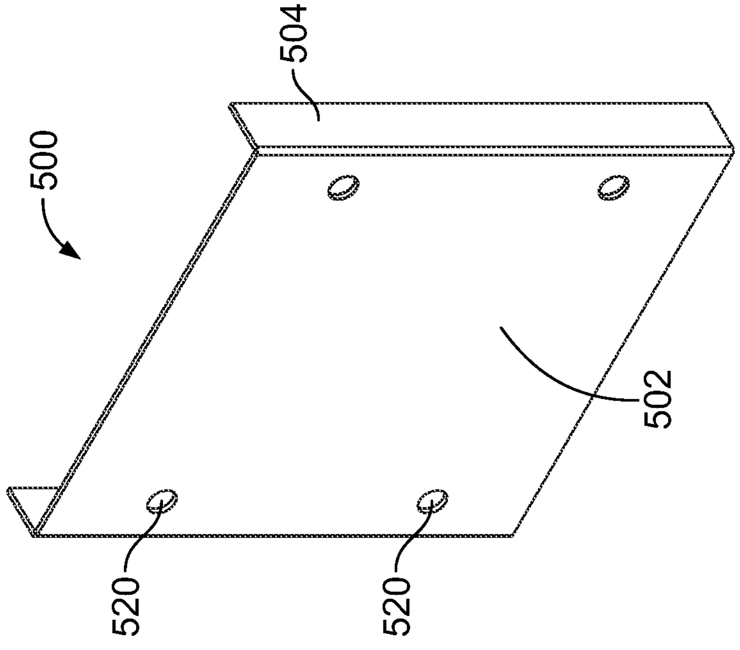
FIG. 24A is a perspective view of arm clamp 500, according to an example embodiment.

FIGS. 24A-24C show arm clamp 500 having mounting holes 520 on major flange 502 for securing the arm clamp 500 to arm 422. Side flanges 504 extend from major flange 502 and as shown in FIG. 24C, threaded extensions 476*a* and 470*a* also extend outwardly from major flange 502 and are used to sandwich an end of arm 422 between major flange 502 and quick release plate 450 (as shown in FIG. 25).

FIG. 25 shows a perspective view demonstrating an embodiment of the room access control system that includes a quick breakaway release configuration. Magnets 430 and 432 are shown positioned within magnet holders 430*a* and 432*a* respectively. Magnet holders 430*a* and 432*a* are secured to major flange 406 of arm mount plate 400, and may be welded to major flange 406. Magnets 430 and 432 may be pencil magnets having part number RMNB-120-30-NI available from Rochester Magnet. Magnets 430 and 432 may be held in place within magnet holders 430*a* and 432*a* using set screws.

Magnets 430 and 432 on arm mount plate 400 are normally in contact with magnets 480 and 482 positioned on quick release plate 450. Lower hinge section 84 is shown welded to the lower right corner of major flange 406 of arm mount plate 400, and upper hinge section 80 is shown welded to the upper left corner of quick release plate 450. In this manner, hinge sections 80 and 84 cooperate to allow the arm 422 to swing outwardly and horizontally when the magnetic contact between magnets 430 and 480, and magnets 432 and 482 are broken.

A first printed circuit board 420 is secured to arm mount plate 400 using fasteners 404*a*. A second printed circuit board 490 is secured to quick release plate 450 using fasteners 460*a*. Wiring 481 extends from the rear of the second printed circuit board 490 to LED light arrays positioned within the arm 422. When the arm is positioned in its normal closed position, with magnet 430 in contact with magnet 480, and magnet 432 in contact with magnet 482, an electrical connection is made between the first printed circuit board 420 and the second printed circuit board 490.

In particular, as shown in FIGS. 26 and 27, the first printed circuit board 420 includes contact receptors 440, 446, 448, and 442 that mate with contact pins 499, 497, 495, and 493 respectively positioned on the second printed circuit board 490. When the arm is closed and the magnets are in contact, an electrical connection is made between the first printed circuit board 420 and the second printed circuit board 490 via the contact receptors and pins to provide power to the LED lighting arrays. When the contact between the magnets is broken as the arm is swung outwardly, the electrical contact between the first and second printed circuit boards is also broken so that power is no longer supplied to the LED light arrays within the arm 422. Thus, the quick release mechanism allows for quick electrical disconnection of arm 422 from base 12.

An alternate to the use of mating contact receptors 440, 446, 448, and 442 with contact pins 499, 497, 495, and 493 may be the use contacting springs instead of contact pins and contact plates instead of contact receptors, where electrical contact is made between the contact springs and contact plates when the arm is in the closed position, and where electrical contact is broken when the arm when the arm 422 is swung outwardly away from base 12.

Furthermore, once the magnetic contact is broken, the only point of contact between base 12 and arm 422 is through the interaction of hinge sections 80 and 84. As a result, arm 422 may be completely removed from base 12 simply by lifting up arm 422 to lift upper hinge section 80 off of the male extension 83 of lower hinge section 84. FIG. 26 shows arm 422 after it has been removed from base 12, and FIG. 27 shows base 12 after arm 422 has been removed.

Therefore, the quick release configuration may be used in an emergency situation to remove the arm. For example, an MRI technician may push outwardly on the rear side of arm 422 to break the magnetic connection between magnets 430 and 480, and magnets 432 and 482, and the arm 422 will swing outwardly about hinge sections 80 and 84 to allow an MRI technician or patient to exit the MRI suite without having to wait for the arm to rotate to its undeployed, generally vertical state.

Furthermore, the quick release hinge mechanism allows for the easy replacement of arm 422. As a result, if the room access control system 10 is moved to a different doorway or is damaged, an appropriate arm or replacement arm could be easily and simply swapped into position replacing the existing arm.

Figure 32A:
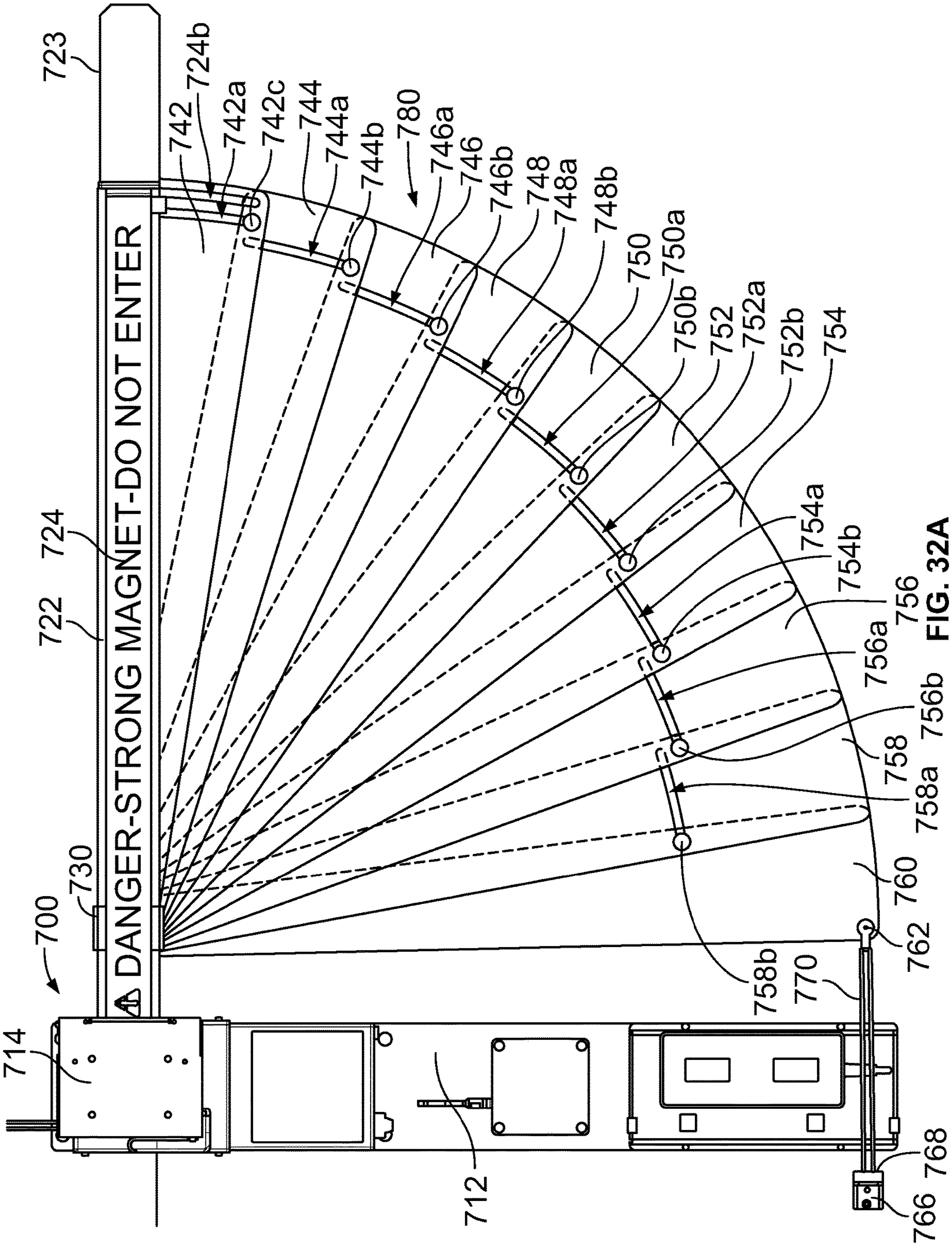
FIG. 32A is a front view of room access control system 700 having a fan assembly 780 fanned out beneath arm 722 which is shown in a second, generally horizontal deployed position.
Figure 32B:
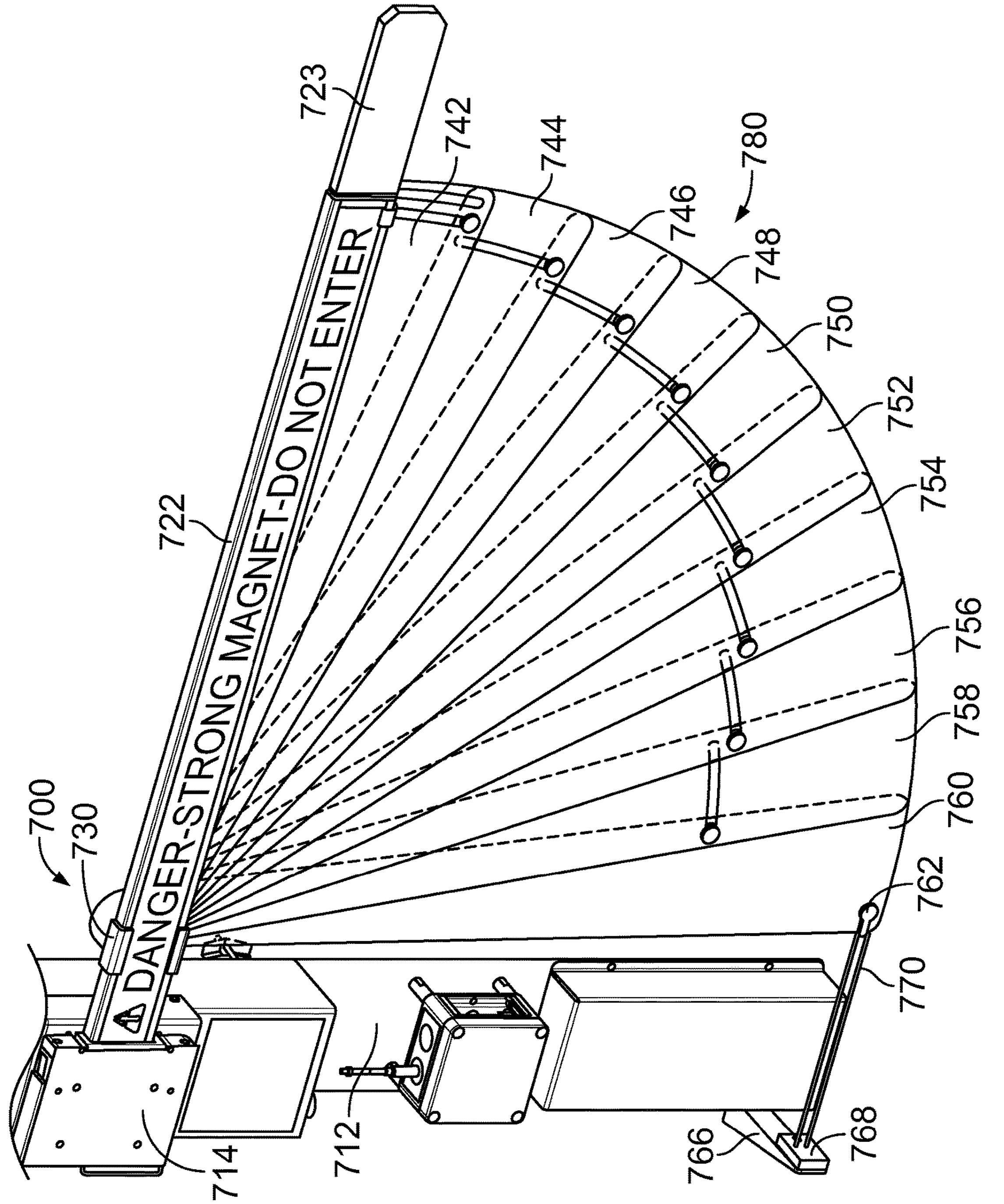
FIG. 32B is a front perspective view of room access control system 700 shown in FIG. 32A.
Figure 32C:
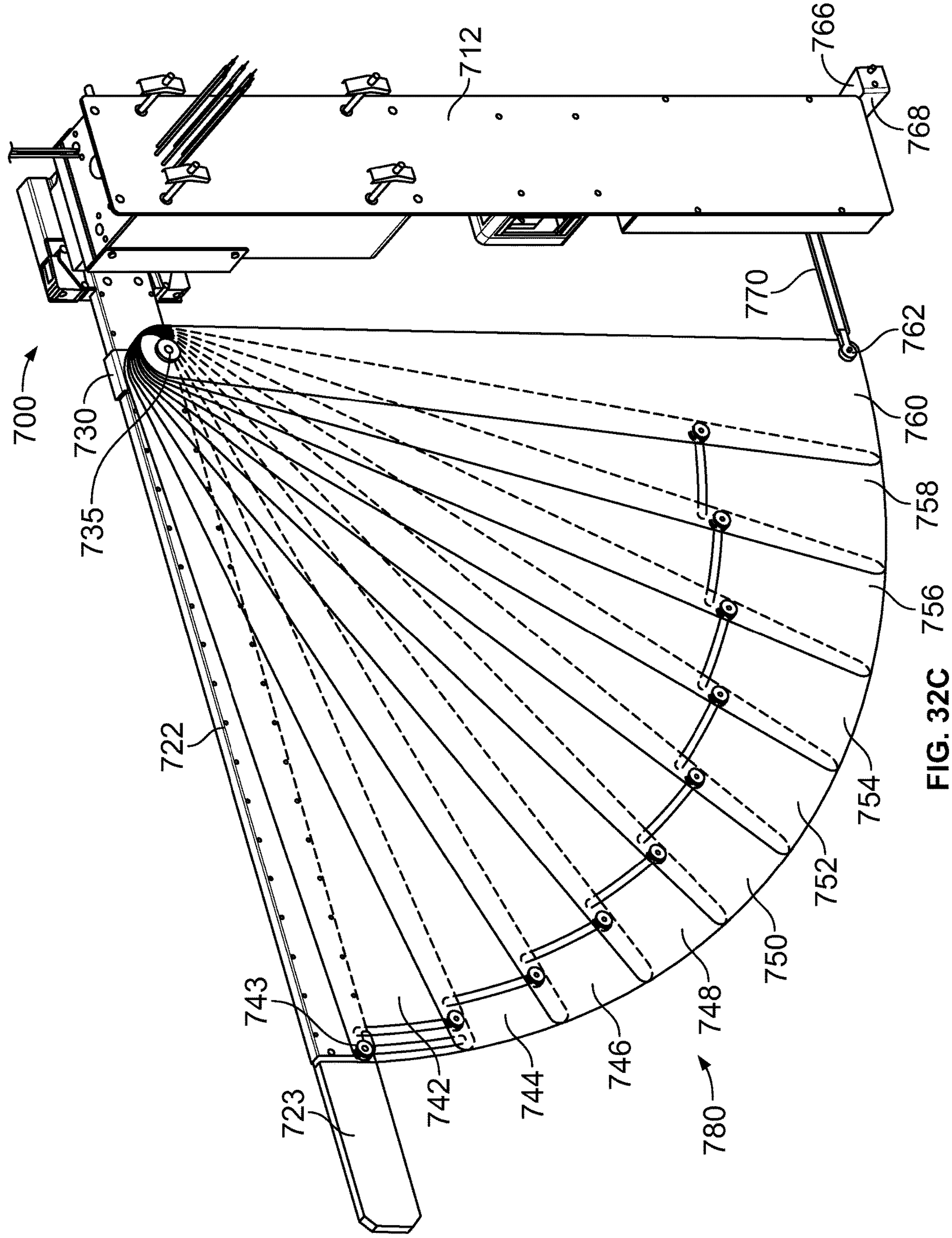
FIG. 32C is a rear perspective view of room access control system 700 shown in FIGS. 32A and 32B.

FIG. 32A is a front view of room access control system 700 having a fan assembly 780 fanned out beneath arm 722 which is shown in a second, generally horizontal deployed position; FIG. 32B is a front perspective view of room access control system 700 shown in FIG. 32A; and FIG. 32C is a rear perspective view of room access control system 700 shown in FIGS. 32A and 32B. Room access control system 700 and its components may be constructed and configured in the same manner as room access control system 10 described above.

Figure 37:
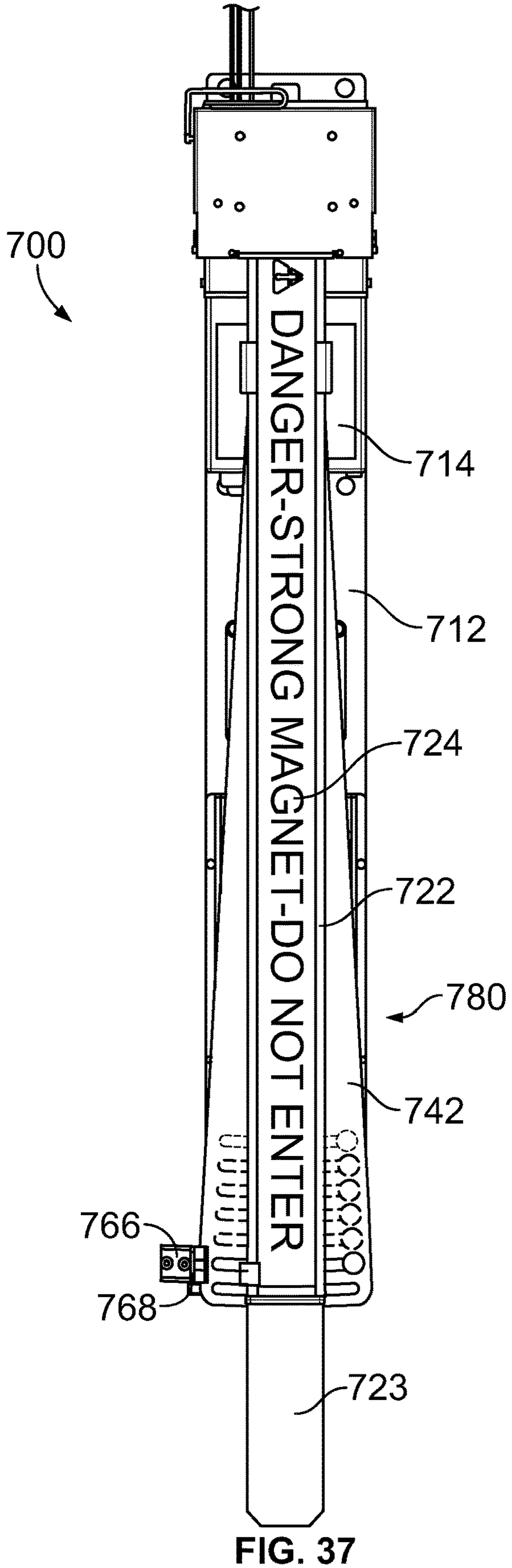
FIG. 37 is a front view of arm 722 shown in a first undeployed position.

Room access control system 700 includes a base assembly 712, and an arm 722 having illuminated warning indicia 724 positioned on a front surface of arm 722 that provide a warning not to enter the room. Arm 722 is mounted to arm receptacle 714 positioned on base assembly 712. The arm receptacle 714 (and arm 722) is pivotally mounted to base assembly 712, and operable to rotate arm 722 from a first undeployed position where the arm 722 is in a generally vertical position as shown in FIG. 37, to a second, generally horizontal deployed position shown in FIGS. 32A-32C. As used herein the term “generally horizontal” means +/−30 degrees from horizontal, and the term “generally vertical” means +/−30 degrees from vertical, when referring to the arm 722 or the fan blades of fan assembly 780.

Arm 722 has a first end mounted to the arm receptacle 714 of base assembly 712, and a second free end 723. As shown in FIGS. 32A-32C, room access control system 700 advantageously includes a fan assembly 780 that is fanned out beneath arm 722 when arm 722 is positioned in the second, generally horizontal deployed position. When in the fanned out position, fan assembly 780 advantageously prevents or hinders a person from ducking under arm 722 to gain access through the doorway to the room. Additionally, the fan assembly 780 may also include further warning indicia to alert a person not to enter the room.

Fan assembly 780 includes a plurality of fan blades, including first fan blade 742 and last fan blade 760 with fan blades 744, 746, 748, 750, 752, 754, 756, and 758 positioned between first fan blade 742 and last fan blade 760. A greater or lesser number of fan blades could also be used in the fan assembly 780. The first fan blade 742 is attached to a rear side of arm 742 with a rivet 743 as shown in FIG. 32C. Rivet 743 extends through a second groove 742*b* of first fan blade 742 and rivet 743 rides through second groove 742*b* when the arm 722 is rotated downwardly into the first undeployed position shown in FIG. 37. When the arm is in the first undeployed position, the rivet 743 is centered within second groove 743 of first fan blade 742, and the remaining fan blades are centered behind first fan blade 742.

Each of plurality of fan blades are pivotally mounted to arm 722 using a long rivet or bolt 735 which extends through the first ends of the plurality of fan blades in the fan assembly 780, and the long rivet or bolt 735 is in turn mounted to plate 730 secured on arm 722. In FIGS. 32A-32C, the first ends of the plurality of fan blades of fan assembly 780 are pivotally mounted to arm 722 at a pivot point between the stationary pivot point of the arm 722 with respect to the base assembly 712 that provides for a spacing and clearance between the fan assembly 780 and base assembly 712. However, it is also possible to pivotally mount the first ends of the plurality of fan blades of fan assembly 780 at the same stationary pivot point that is used for pivotally mounting the arm 722 to the base assembly 712.

Each of the plurality of fan blades of the fan assembly 780 is secured to an adjacent fan blade with a rivet extending through one of the fan blades and extending into a groove in an adjacent fan blade to allow for the relative movement of the fan blades during upward rotation of arm 722 into the second, generally horizontal deployed position, and during downward rotation of arm 722 into the first undeployed position shown in FIG. 37. In particular, rivet 742*c* extends through fan blade 744 into a first groove 742*a* in first fan blade 742; rivet 744*b* extends through fan blade 746 into groove 744*a* in fan blade 744; rivet 746*b* extends through fan blade 748 into groove 746*a* in fan blade 746; rivet 748*b* extends through fan blade 750 into groove 748*a* in fan blade 748; rivet 750*b* extends through fan blade 752 into groove 750*a* in fan blade 750; rivet 752*b* extends through fan blade 754 into groove 752*a* in fan blade 752; rivet 754*b* extends through fan blade 756 into groove 754*a* in fan blade 754; rivet 756*b* extends through fan blade 758 into groove 756*a* in fan blade 756; and rivet 758*b* extends through last fan blade 760 into groove 758*a* in fan blade 758.

Each of the grooves in the second ends of the fan blades of the fan assembly 780 are offset which advantageously eliminates stacking of the rivets extending through the second ends of the fan blades on top of each other, and reducing the fan blade depth, when the arm is in the first undeployed position shown in FIG. 37. Additionally, this fan blade configuration in the first undeployed position allows for the fan assembly 780 to be stacked behind the first arm 722 and presents no encumbrance for clear access to the room.

As shown in FIGS. 32A-32C, the second ends of the fan blades of fan assembly 780 do not extend as far as an outermost end of second end 723 as arm 722. However, in other embodiments, the second ends of the fan blades of fan assembly 780 may extend to the outermost end of second end 723 of arm, or beyond the outermost end of second end 723 of arm 722, provided there is enough clearance above a ground surface when the arm is positioned in the first undeployed position.

In addition, as shown in FIGS. 32A-32C and FIG. 37, each of the plurality of fan blades of fan assembly 780 have an equal length. However, in other embodiments, one or more of the plurality of fan blades of fan assembly may have different lengths. For example, a centrally located fan blade may have a longer length than first fan blade 742, and each adjacent fan blade may have increasingly shorter lengths than the central fan blade, which provides for a larger surface area of fan assembly 780 when fan assembly 780 is in a fanned out configuration when arm 722 is positioned in the second, generally horizontal deployed position to provide even more of a barrier beneath arm 722 to prevent or hinder a person from ducking under arm 722 to gain access to the room.

The fan blades of fan assembly 780 may be made of plastic, such as polyvinyl chloride (PVC). Other materials may also be used, such as a composite material or a metal, such as aluminum. In addition, the fan assembly 780 is constructed such that one or all of the fan blades may be replaced if there is wear or damage to one or more of the fan blades. For example, a single fan blade may be replaced simply by removing the rivets connected to the second end of the single fan blade and the long rivet or bolt 735 extending through the first end of the single fan blade, and then reattaching the rivets on the second end of the replacement fan blade and the long rivet or bolt 735 extending through the first end of the replacement fan blade.

Room access control system 700 may also include a stop 766 that may be mounted to a wall. The stop 766 may include a bumper 768 (such as a foam bumper) that prevents further rotation of the last fan blade 760 when the arm 722 is rotated downward into the first undeployed position, which may occur when one or more of the rivets extending through the second ends of the plurality of fan blades of fan blade assembly 780 stick within the grooves on the second ends of the fan blades. In this regard, to prevent sticking of the rivets in the grooves, the rivets are made of a material with a high lubricity or low coefficient of friction, and be made from a plastic or composite material.

In addition, an attachment 762 is secured to the second end of the last fan blade 760 to which a first end of restraint cord 770 is attached. A second end of restraint cord 770 is secured to the stop 766. Restraint cord 770 serves to prevent upward rotation of the second end of last fan blade 760 when the arm is rotated upwardly into the second, generally horizontal deployed position, which may occur when one or more of the rivets extending through the second ends of the plurality of fan blades of fan blade assembly 780 stick within the grooves on the second ends of the fan blades. Therefore, by restraining and preventing rotation of the second end of last fan blade 760, restraint cord 770 serves to ensure that the fan blades of fan assembly 780 are in a fanned out position when the arm 722 has been rotated into the second, generally horizontal deployed position. Restraint cord 770 may be made of an elastic material, such as a bungee cord.

Figure 33:
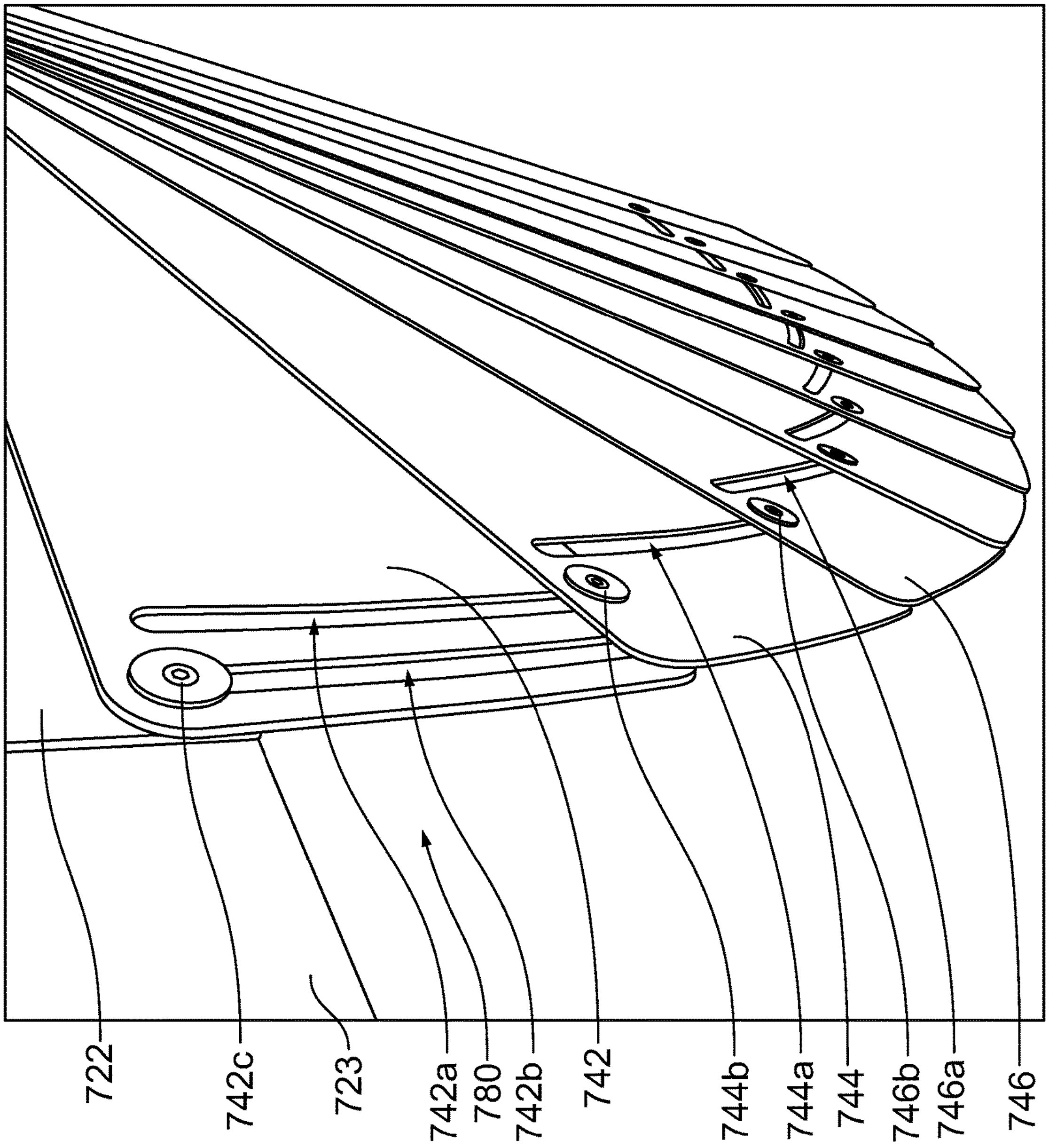
FIG. 33 is a partial perspective rear view of fan assembly 780 fanned out beneath arm 722.

FIG. 33 is a partial perspective rear view of fan assembly 780 fanned out beneath arm 722. Rivet 742*c* is shown extending through second groove 742*b* in the second end of first fan blade 742 into the rear side of arm 722, thereby securing first fan blade 742 to arm 722. Rivet 744*b* is shown extending through the second end of fan blade 744 and into first groove 742*a* in the second end of first fan blade 742, thereby securing fan blade 744 to first fan blade 742, and allowing for relevant movement between fan blade 744 with respect to first fan blade 742. Rivet 746*b* is shown extending through the second end of fan blade 746 and into first groove 744*a* in the second end of fan blade 744, thereby securing fan blade 746 to fan blade 744, and allowing for relevant movement between fan blade 746 with respect to fan blade 744.

Figure 34:
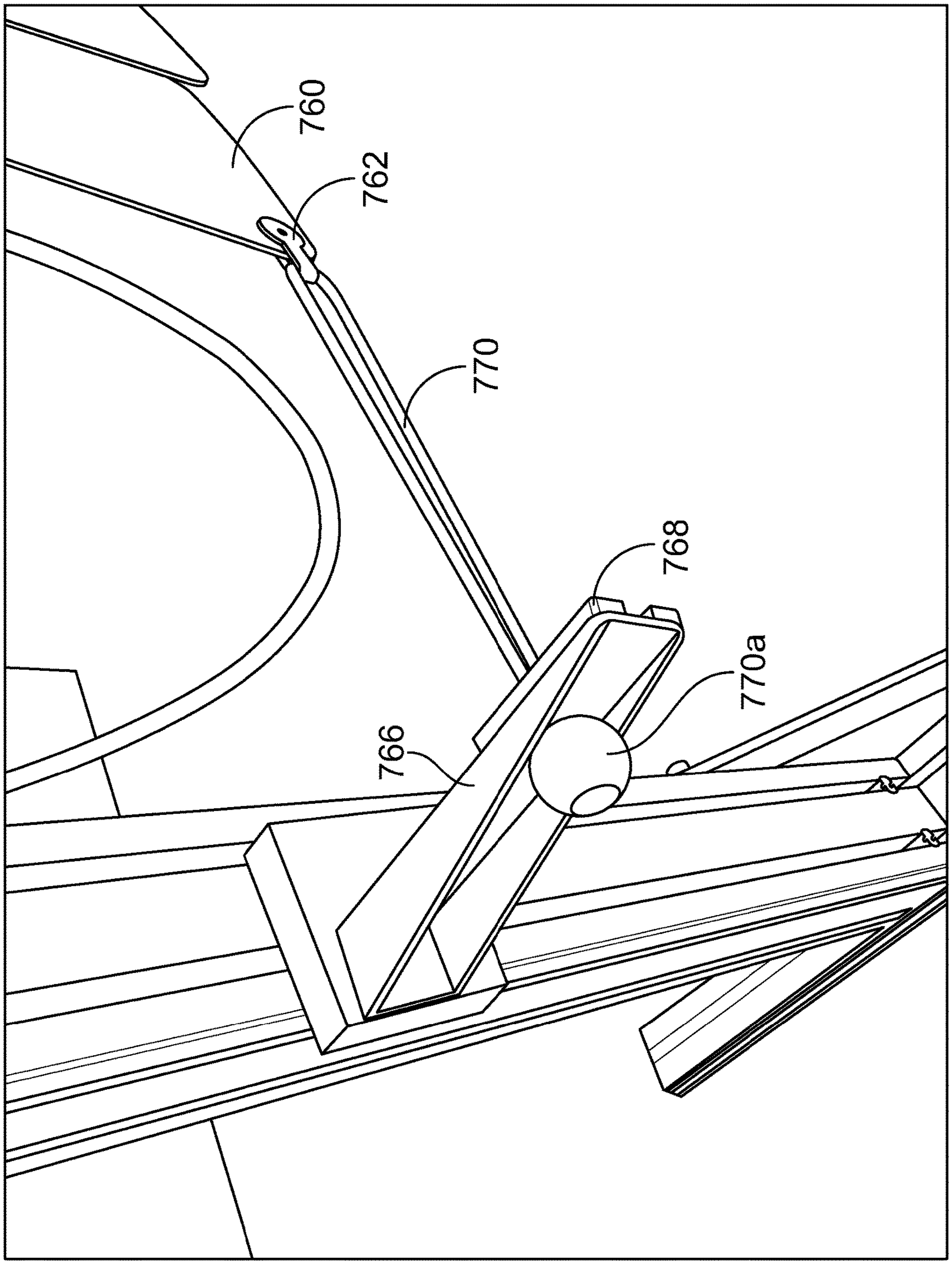
FIG. 34 is a perspective view of stop 766 with restraint cord 770 attached to attachment 762 of last fan blade 760.

FIG. 34 is a perspective view of stop 766 with restraint cord 770 having a first end attached to attachment 762 positioned on the second end of last fan blade 760, and a second end attached to stop 766. As noted above stop 766 may include a bumper (such as a foam bumper), and stop 766 prevents further rotation of the second end of last fan blade 760 when the arm is rotated downwardly into the first undeployed position. Restraint cord 770 also prevents upward rotation of the second end of last fan blade 760 when to the arm is rotated into the second, generally horizontal deployed position, thereby ensuring that the fan assembly 780 is in a fanned out position beneath arm 722 when the arm is positioned in the second, generally horizontal deployed position.

Figure 35:
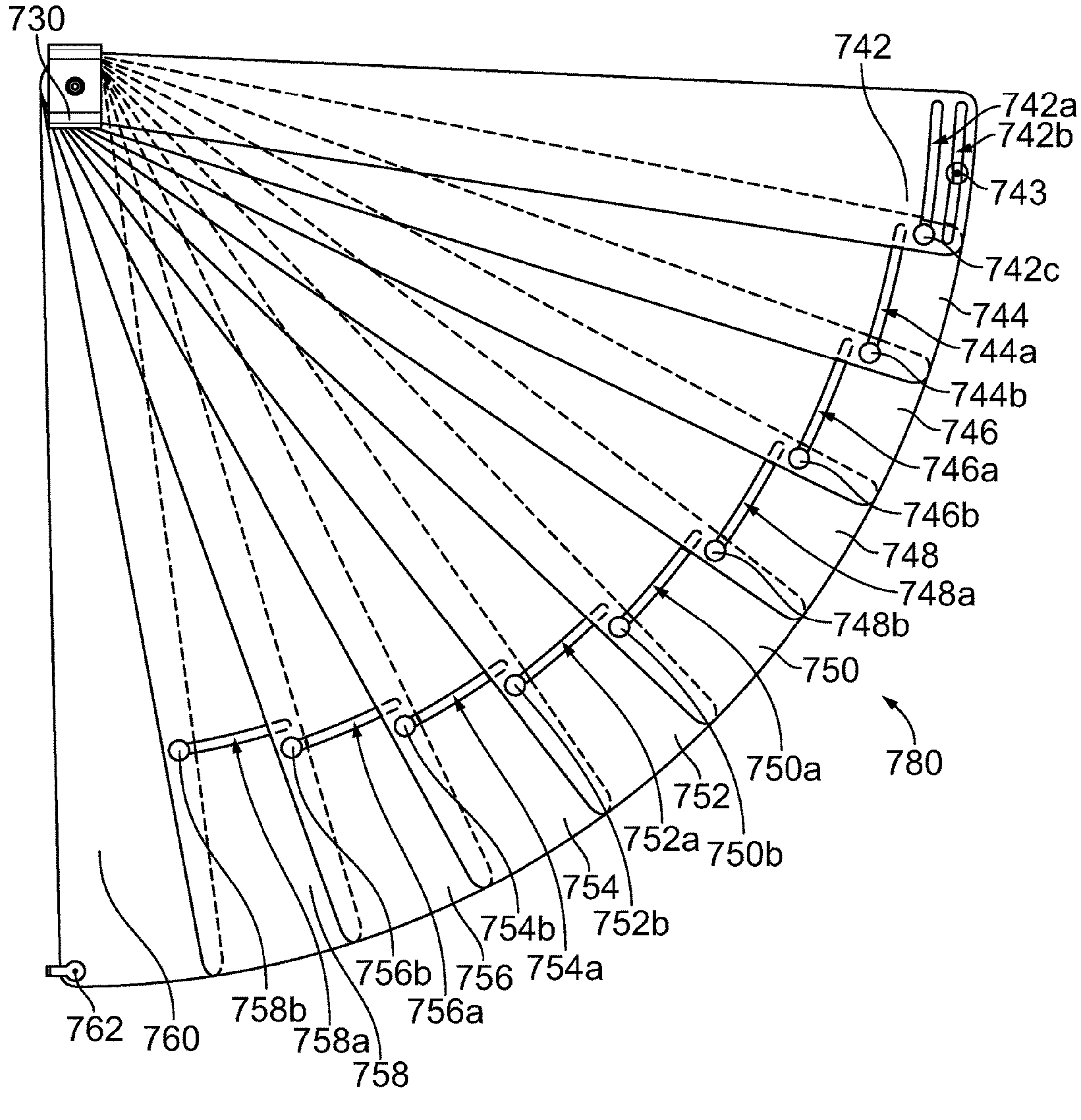
FIG. 35 is a front view of fan assembly 780.

FIG. 35 is a front view of fan assembly 780. Each of the plurality of fan blades of the fan assembly 780 is secured to an adjacent fan blade with a rivet extending through one of the fan blades and extending into a groove in an adjacent fan blade to allow for the relative movement of the fan blades during upward rotation of arm 722 into the second, generally horizontal deployed position, and during downward rotation of arm 722 into the first undeployed position shown in FIG. 37. In particular, rivet 742*c* extends through fan blade 744 into a first groove 742*a* in first fan blade 742; rivet 744*b* extends through fan blade 746 into groove 744*a* in fan blade 744; rivet 746*b* extends through fan blade 748 into groove 746*a* in fan blade 746; rivet 748*b* extends through fan blade 750 into groove 748*a* in fan blade 748; rivet 750*b* extends through fan blade 752 into groove 750*a* in fan blade 750; rivet 752*b* extends through fan blade 754 into groove 752*a* in fan blade 752; rivet 754*b* extends through fan blade 756 into groove 754*a* in fan blade 754; rivet 756*b* extends through fan blade 758 into groove 756*a* in fan blade 756;

and rivet 758*b* extends through last fan blade 760 into groove 758*a* in fan blade 758.

Figure 36A:
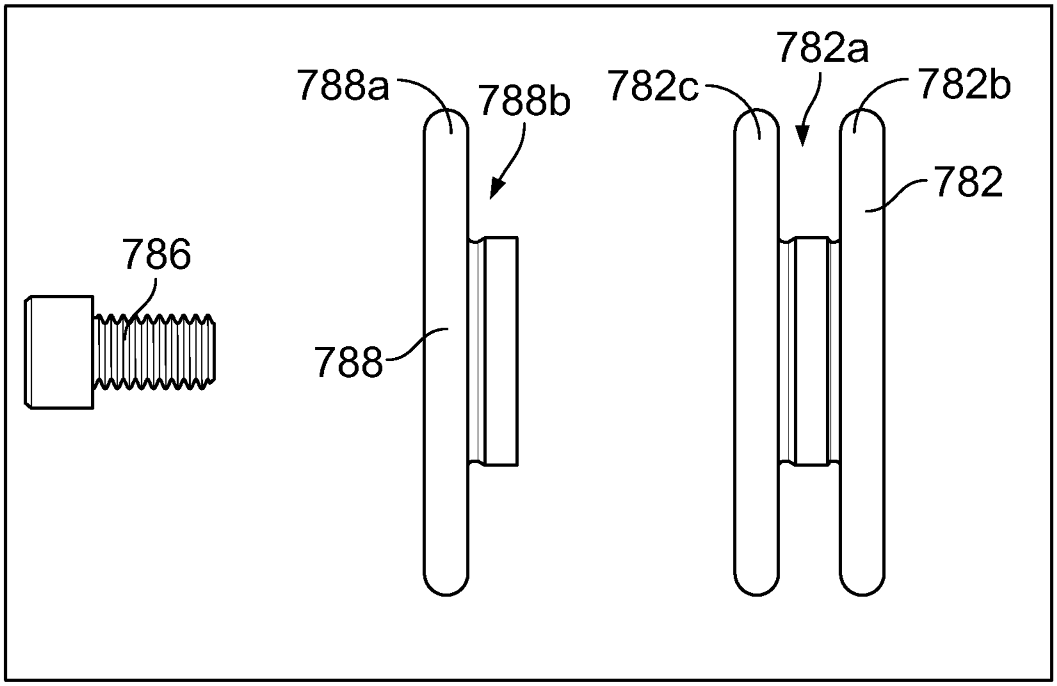
FIG. 36A is an exploded side view of first rivet component 788 and second rivet component 782 used to connect adjacent fan blades of fan assembly 780 together.
Figure 36B:
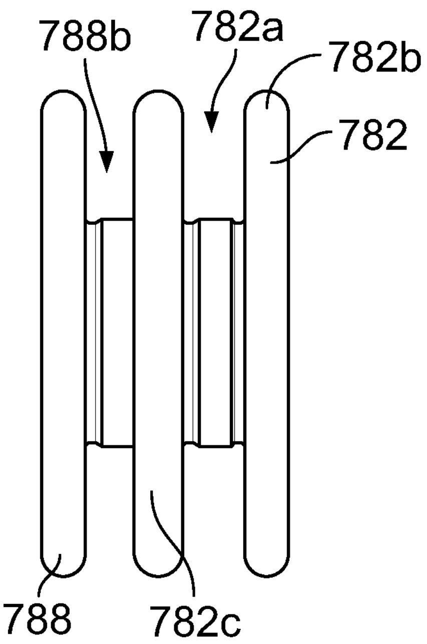
FIG. 36B is a side view of rivet components 788 and 782 after screw 786 has joined them together into an assembled state.

FIG. 36A is an exploded side view of first rivet component 788 and second rivet component 782 used to connect adjacent fan blades of fan assembly 780 together. On the left side of FIG. 36A, a screw 786 is shown that is used to connect first rivet component 788 to second rivet component 782. First rivet component 788 includes rivet end 788*a* and a gap 788*b*. Second rivet component 782 includes rivet ends 782*b* and 782*c* with a gap 782*a* positioned between rivet ends 782*b* and 782*c*. A side view of rivet components 788 and 782 after screw 786 has joined them together into an assembled state is shown in FIG. 36B. In the assembled state shown in FIG. 36B, gaps 788*b* and 782*a* are provided that allow the positioning of a second end of a fan blade in gap 788*b*, and the positioning of a second end of an adjacent fan blade in gap 782*a*.

FIG. 37 is a front view of room access control system 700 with arm 722 shown in the first undeployed position where arm 722 is in a generally vertical position. Fan assembly 780 is shown with the plurality of fan blades stacked behind arm 722 in a generally vertical position. End 723 of arm 722 in this first undeployed state is positioned above a ground surface.

Figure 38:
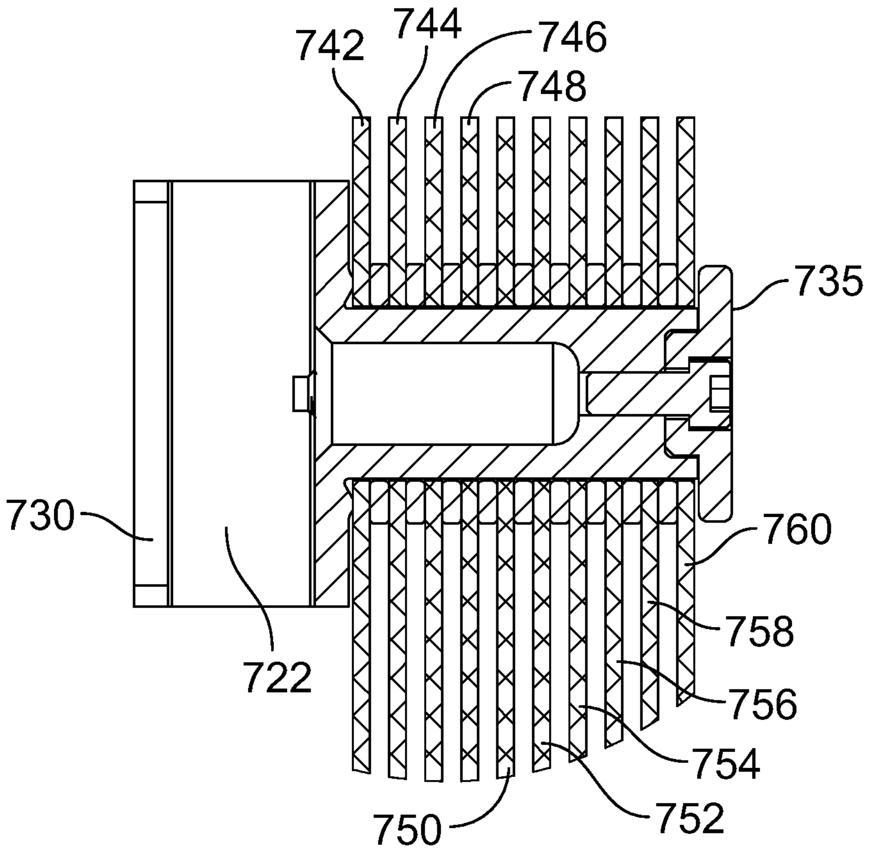
FIG. 38 is a close-up side cross-sectional view of fan blades secured together with connector 735.
Figure 39:
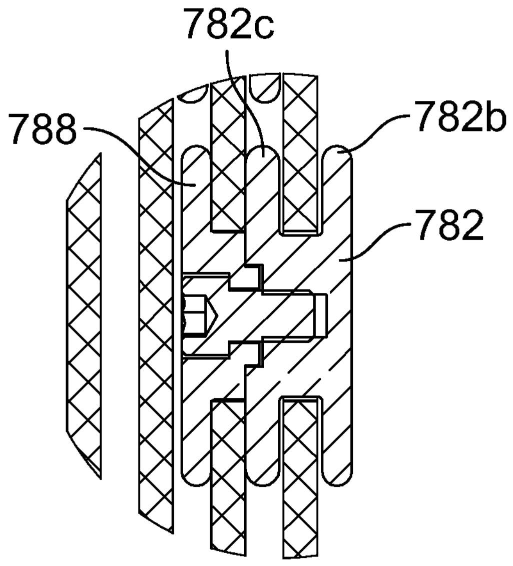
FIG. 39 is a close-up side cross-sectional view of fan blades secured together with rivet components 780 and 782.

FIG. 38 is a close-up side cross-sectional view of fan blades 742, 744, 746, 748, 750, 752, 754, 756, 758, and 760 secured together with long rivet or bolt 735 and stacked behind arm 722 in the first undeployed position. FIG. 39 is a close-up side cross-sectional view of fan blades secured together with first rivet component 788 and second rivet component 782. A fan blade is shown positioned in gap 788*b* with an adjacent fan blade positioned in gap 782*a*.

Room access control system 700 advantageously includes a fan assembly 780 pivotally mounted to arm 722 which includes a plurality of fan blades that extend in a fanned out configuration beneath arm 722 when arm 722 is in a second, generally horizontal deployed position. Fan assembly 780, when the plurality of fan blades are in a fanned out configuration, serves to prevent or hinder a person from ducking under arm 722 to gain access to a room.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

We claim:

1. A room access control system comprising:

a base assembly attachable to a wall or door jamb adjacent a door opening to a room;

an arm having a first end pivotally mounted with respect to the base assembly at a stationary pivot point relative to the base for rotation about a pivot axis, the arm also having a second end;

wherein the arm is positionable in a first undeployed position where the arm is generally vertical and the second end of the arm points downwardly;

wherein the arm is pivotable from the first undeployed position, upwardly to a second, generally horizontal deployed position, where the arm extends at least partially across the door opening;

wherein a fan assembly is attached to the arm, the fan assembly including a plurality of fan blades;

wherein each of the fan blades has a first end that is pivotally mounted to the arm;

wherein each of the fan blades has a second end that is attached to, and movable with respect to, an adjacent fan blade;

wherein when the arm is in the first undeployed position, each of the plurality of fan blades is in a generally vertical position beneath the arm; and wherein the arm is in the second, generally horizontal deployed position, the plurality of fan blades extend beneath the arm in a fanned out pattern with the second end of a first fan blade of the plurality of fan blades attached to the arm, and a last fan blade of the plurality of fan blades positioned in a generally vertical position.

2. The room access control system of claim 1, wherein the arm is configured to move upward to the second, generally horizontal deployed position by automated rotation of the first end of the arm in response to activation of a button positioned on the base, or receipt of a wireless signal by a receiver positioned on the base.

3. The room access control system of claim 1, wherein when the arm is in the second, generally horizontal deployed position, the second end of the first fan blade extends downwardly from the arm a distance less than a width of the second end of the first fan blade.

4. The room access control system of claim 1, wherein the second ends of the plurality of fan blades are positioned adjacent the second end of the arm when the arm is in the first undeployed position.

5. The room access control system of claim 1, wherein a pivot point on the arm to which the plurality of fan blades are pivotally mounted to is positioned on the arm between the stationary pivot point of the arm and the second end of the arm.

6. The room access control system of claim 1, wherein the second end of the last fan blade includes an attachment point;

wherein a restraint cord has a first end secured to the attachment point on the second end of the last fan blade; and wherein a second end of the restraint cord is secured to a stop positioned on a wall.

7. The room access control system of claim 6, wherein the stop includes a bumper and the stop is configured to prevent further rotation of the second end of the last fan blade when the arm is rotated downwardly from the second generally horizontal, deployed position to the first undeployed position.

8. The room access control system of claim 6, wherein the restraint cord is configured to hinder movement of the second end of the last fan blade upon upward movement of the arm to the second generally horizontal, deployed position.

9. The room access control system of claim 6, wherein the restraint cord comprises an elastic cord.

10. The room access control system of claim 1, wherein each of the second ends of the plurality of fan blades, other than the last fan blade, includes a groove, and a rivet extends through the groove of a fan blade and into the groove of an adjacent fan blade to provide for relative movement of the second ends of adjacent fan blades relative to each other when the arm is moved upwardly into the second, generally horizontal deployed position.

11. The room access control system of claim 10, wherein the second end of the first fan blade includes a second groove, and a second rivet extends through the second groove on the second end of the first fan blade into the arm to provide for centering of the fan blade relative to the arm when the arm is in the first undeployed position.

12. The room access control system of claim 10, wherein the grooves of the second ends of the plurality of fan blades are offset from each other to prevent stacking of the rivets of adjacent fan blades when the arm is in the first undeployed position.

13. The room access control system of claim 1, wherein each of the first ends of the plurality of fan blades is pivotally mounted to the pivot point on the arm on a rear side of the arm.

14. The room access control system of claim 1, wherein each of the fan blades of the fan assembly is replaceable in case of damage or wear to one or all of the plurality of fan blades.

15. The room access control system of claim 1, wherein lighted warning indicia are positioned on a front side of the arm.

16. The room access control system of claim 1, wherein warning indicia are positioned on a front side of the fan assembly when the arm is in the second, generally horizontal deployed position.

17. The room access control system of claim 1, wherein the second ends of the plurality of fan blades extend to a position short of an outermost end of the second end of the arm.

18. The room access control system of claim 1, wherein the plurality of fan blades have varying lengths.

19. The room access control system of claim 1, wherein a rotatable arm mount plate is attached to the base and the rotatable arm mount plate is in a vertical position;

wherein a vertical quick release plate is attached to the first end of the arm;

wherein the rotatable arm mount plate and the vertical quick release plate are hingedly mounted to each other with a hinge that allows the arm to rotate about a pivot axis of the hinge generally parallel to a ground surface to allow egress from a magnetic resonance imaging (MRI) room; and wherein the vertical quick release plate attached to the first end of the arm is coupled to the rotatable arm mount plate with a magnetic coupling comprising one or more magnets extending outwardly from the rotatable arm mount plate and one or more magnets extending inwardly from the vertical quick release plate, to provide a breakaway point between the pivot axis of the hinge and the second end of the arm.

20. The room access control system of claim 19, wherein the arm is configured such that a force exerted against a rear side of the arm will cause a break in the magnetic coupling and cause the arm to swing outwardly while pivoting on the hinge where the arm remains attached to the base via the hinge.

21. The room access control system of claim 1, wherein adjacent fan blades in the plurality of fan blades of the fan assembly are movably secured together with a rivet that extends through one of the plurality of fan blades and into a groove in an adjacent fan blade.

22. The room access control system of claim 21, wherein:

the rivet includes a first rivet component having a first rivet abutment end and a first gap adjacent the first rivet abutment end, and a second rivet component having a second rivet abutment end and a third rivet abutment end with a second gap between the second rivet abutment end and the third rivet abutment end;

the first and second rivet components are assembled together with a screw;

when the first and second rivet components are assembled together, the first gap is positioned between the first rivet abutment end of the first rivet component and the second rivet abutment end of the second rivet component, and the first gap is spaced such that the fan blade is positioned within the first gap; and the second gap of the second rivet component is spaced such that an adjacent fan blade is positioned within the second gap.

23. A first room access control system constructed in accordance with claim 1 having the arm extendable inwardly from a left side of a doorway when the arm is in the second, generally horizontal deployed position, and a second room access control system constructed in accordance with claim 1 having the arm extendable inwardly from a right side of the doorway when the arm is in the second, generally horizontal deployed position.

* * * * *